(12) United States Patent
Jelinek et al.

(10) Patent No.: US 10,304,260 B2
(45) Date of Patent: May 28, 2019

(54) AUTOMATED VEHICLE IDENTIFICATION AND INSPECTION DATA PROCESSING SYSTEM

(71) Applicant: Verizon Patent and Licensing, Inc., Basking Ridge, NJ (US)

(72) Inventors: Howard Jelinek, Aliso Viejo, CA (US); Ralph James Mason, Christchurch (NZ)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 92 days.

(21) Appl. No.: 15/334,233

(22) Filed: Oct. 25, 2016

(65) Prior Publication Data

US 2017/0116792 A1 Apr. 27, 2017

Related U.S. Application Data

(60) Provisional application No. 62/246,550, filed on Oct. 26, 2015, provisional application No. 62/315,591, filed on Mar. 30, 2016.

(51) Int. Cl.
| | |
|---|---|
| G07C 5/00 | (2006.01) |
| H04W 4/02 | (2018.01) |
| G07C 5/12 | (2006.01) |
| G07C 5/08 | (2006.01) |
| G06Q 10/00 | (2012.01) |
| G06Q 50/30 | (2012.01) |

(52) U.S. Cl.
CPC ............. *G07C 5/008* (2013.01); *G06Q 10/20* (2013.01); *G06Q 50/30* (2013.01); *G07C 5/085* (2013.01); *G07C 5/12* (2013.01); *H04W 4/02* (2013.01)

(58) Field of Classification Search
CPC .......... G07C 5/008; G07C 5/12; G07C 5/085; G06Q 50/30; G06Q 10/20; H04W 4/02
See application file for complete search history.

(56) References Cited

U.S. PATENT DOCUMENTS

| | | | |
|---|---|---|---|
| 6,671,646 B2 | 12/2003 | Manegold et al. |
| 6,804,626 B2 | 10/2004 | Manegold et al. |
| 7,117,121 B2 | 10/2006 | Brinton et al. |
| 7,362,229 B2 | 4/2008 | Brinton et al. |
| 7,557,696 B2 | 7/2009 | Brinton et al. |
| 7,564,375 B2 | 7/2009 | Brinton et al. |
| 7,680,595 B2 | 3/2010 | Brinton et al. |
| 7,769,499 B2 | 8/2010 | McQuade et al. |
| 7,808,369 B2 | 10/2010 | Brinton et al. |
| 7,944,345 B2 | 5/2011 | Brinton et al. |
| 8,106,757 B2 | 1/2012 | Brinton et al. |
| 8,400,296 B2 | 3/2013 | Brinton et al. |

(Continued)

FOREIGN PATENT DOCUMENTS

AU 2002322510 B2 7/2002

*Primary Examiner* — Adam R Mott

(57) ABSTRACT

This disclosure relates to systems and methods for providing an automated verification and analysis of vehicle inspection reports to a vehicle management system. Among other features, the vehicle management system can determine the type of vehicle to be inspected during a vehicle inspection report, provide customized reports associated with the identified vehicle, and provide automatic analysis and verification that the vehicle inspection report was completed in accordance with the defined parameters of the vehicle inspection report.

17 Claims, 21 Drawing Sheets

(56) References Cited

U.S. PATENT DOCUMENTS

| | | | |
|---|---|---|---|
| 2005/0040224 A1* | 2/2005 | Brinton | G06Q 10/06 235/376 |
| 2006/0114531 A1* | 6/2006 | Webb | G01N 21/8806 359/15 |
| 2013/0158777 A1* | 6/2013 | Brauer | G06Q 10/20 701/31.4 |

* cited by examiner

VEHICLE INSPECTION REPORT

TRACTOR INSPECTION

COMPONENTS — IMAGE
- [✓] AIR COMPRESSOR [✓]
- [✓] AIR LINES [✓]
- [✓] BATTERY [ ]
- [✓] BODY [✓]
- [✓] BRAKE ACCESSORIES [✓]
- [✓] BRAKES, PARKING [✓]
- [✓] BRAKES, SERVICE [✓]
- [✓] DRIVE LINE [✓]
- [✓] ENGINE [✓]
- [✓] EXHAUST [✓]
- [✓] FRAME AND ASSEMBLY [✓]
- [ ] WHEELS [ ]

TRAILER INSPECTION
- [ ] BRAKE CONNECTIONS [ ]
- [ ] COUPLING DEVICES [ ]
- [ ] HITCH [ ]
- [ ] LANDING GEAR [ ]
- [ ] LIGHTS [ ]
- [ ] SUSPENSION [ ]
- [ ] WHEELS AND RIMS [ ]

INSTRUCTIONS:
PHOTOGRAPH ONLY NECESSARY IF WHEELS/TIRES ARE DAMAGED

*FIG. 3B*

AUTOMATED VEHICLE IDENTIFICATION AND INSPECTION DATA PROCESSING SYSTEM

BACKGROUND

Periodic inspection of the components of a vehicle is beneficial, for example, for identifying needs for unscheduled maintenance or repairs. Commercial vehicle operators are typically required to perform daily, pre- and post-trip inspections of components such as brake systems, fuel systems, warning lights, tires, and the like. Timely and accurate inspections can help reduce fuel consumption and prevent breakdowns on the road, thereby preventing increased costs and losses.

SUMMARY

An aspect of at least one of the embodiments disclosed herein includes the realization that performing and documenting a vehicle inspection, such as a vehicle inspection that may be required by a vehicle fleet owner as a standard operating procedure, can be simplified.

For example, some known vehicle inspection documentation systems rely on the use of vehicle identity and/or inspection location identifiers added to each vehicle of a fleet. In one known system, each inspection location of each vehicle is provided with a unique identifier. The addition of such unique identifiers requires additional labor and costs for incorporating a new vehicle into an existing fleet. Additionally, such identifiers themselves may need inspection, maintenance, or replacement, thereby adding to the overall hardware and labor costs associated with such an inspection system.

An aspect of the least one of the embodiments disclosed herein includes the realization that a vehicle inspection and documentation system can include features and/or functionality incorporating use of electronic vehicle inspection interface which can identify a vehicle and/or vehicle inspection points, without the use of additional location identifiers identifying every inspection location of a vehicle.

For example, in some embodiments, a vehicle inspection and documentation system can incorporate automated recognition of an identity of a vehicle of a fleet based on accessible indicia and/or characteristics for example, those which are plainly visible, to identify a vehicle. In some examples, a vehicle inspection and documentation system includes features and functionality for recognizing indicia on a license plate from an image of a license plate on a vehicle, for example with optical character recognition, then establishing a unique identity of a vehicle with reference to predetermined information about a fleet to which the vehicle is associated. Other accessible characteristics of a vehicle can also be used for establishing a partial or unique identity of a vehicle.

Another aspect of at least one of the inventions disclosed herein includes the realization that images of inspection locations, for example, collected during a vehicle inspection procedure, can be incorporated into the process of completing a vehicle inspection report, even where all of such images do not include additional unique vehicle location identifiers.

In some embodiments, the present disclosure provides a method of remote verification of a vehicle inspection. The method can include capturing a first image of at least a portion of a vehicle comprising a unique vehicle identification indicia; obtaining vehicle identification information identifying a vehicle based, at least in part, on an analysis of the first image; providing an interface associated with a vehicle inspection report for the identified vehicle, the vehicle inspection report comprising at least one data field associated with a first inspection location on the vehicle; capturing one or more images associated with the first inspection location on the vehicle included within the vehicle inspection report; receiving an input indicating completion of the first inspection location on the vehicle; and providing at least a portion of data associated with the completion of the inspection location to a vehicle management system.

In some embodiments, the present disclosure provides a system for remote verification of a vehicle inspection. The system can include a data store configured to store vehicle inspection information associated with a plurality of vehicle inspection reports, and a computing device. The computing device can be include a hardware processor configured with executable instruction that configure the processor to receive a first image of at least a portion of a vehicle comprising vehicle identification information; obtain vehicle identification information identifying a vehicle based, at least in part, on an analysis of the first image; provide an interface associated with a vehicle inspection report for the identified vehicle, the vehicle inspection report comprising at least one data field associated with an inspection location on the vehicle; capture one or more images associated with the inspection location on the vehicle included within the vehicle inspection report; and update the vehicle inspection report to indicate that the completion of the inspection location on the vehicle.

In some embodiments, the present disclosure provides a method of remote verification of a vehicle inspection. The method can include receiving a first image of at least a portion of a vehicle comprising vehicle identification information; processing the first image to identify a vehicle based, at least in part, on the vehicle identification information; providing an interface associated with a vehicle inspection report for the identified vehicle, the vehicle inspection report comprising at least one data field associated with an inspection location on the vehicle; receiving one or more images associated with the inspection location on the vehicle included within the vehicle inspection report; and receiving an input indicating completion of the inspection location on the vehicle.

For purposes of summarizing the disclosure, certain aspects, advantages, and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

FIGS. 3A and 3B illustrate an embodiment of an interface for a vehicle inspection report.

DETAILED DESCRIPTION

Introduction

Figure 1A:
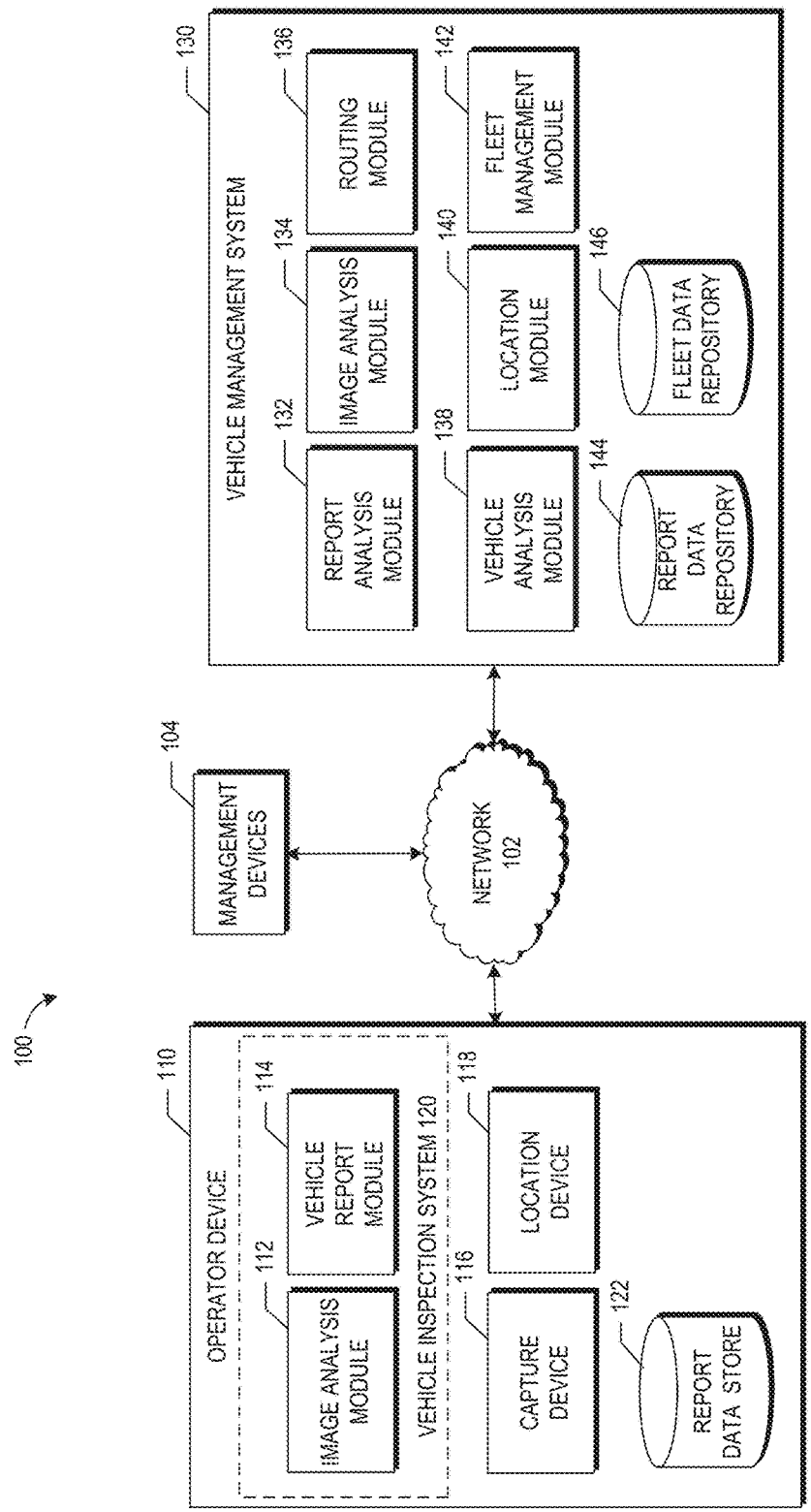
FIGS. 1A and 1B illustrate embodiments of a computing environment for a vehicle management system.

Some operators of commercial vehicles perform pre- and post-trip inspections of the vehicle. The vehicle inspection may involve a written inspection report that the operator must complete to verify that the inspection was completed. The vehicle inspections may include inspections of various aspects of the vehicle, such as the engine, tires, trailer coupling, and the like. Such inspections can be performed in accordance with a vehicle inspection report form which can include a plurality of inspection requirements, for example, a list of items of a vehicle to be inspected. Some inspection procedures require an operator to inspect one item, mark an area box associated with that item (e.g., a box on a checklist) as an indication that the inspection of the corresponding item was completed, and then proceed to the inspection of the next item. However, it is possible for operators to check all of the boxes on such a checklist without inspecting all of the items according to an associated inspection procedure.

Thus, some of the embodiments disclosed herein include a vehicle inspection system configured to provide more reliable verification that a vehicle operator performed the required vehicle inspections. In some embodiments, a system for verification of a vehicle inspection can utilize image or video data in an inspection of the vehicle.

For example, a vehicle inspection report can include fields reserved for images of various aspects of the vehicle captured during the inspection. If all of the required fields are not provided with images, the report would not be considered as complete.

In some embodiments, an inspection of a vehicle can be performed with a mobile computing device, such as a smart phone or tablet computing device that can be carried by the operator and used during the inspection. Such a mobile computing device can be in electronic communication with a vehicle inspection system. The vehicle inspection system can be located on a remote computing device, communicating with the mobile computing device over a network. In such embodiments, the mobile computing device can receive user-interfaces from the vehicle inspection system and send information entered, received, or detected by the mobile computing device to the vehicle inspection system. Optionally, the mobile device can include the vehicle inspection system.

In some embodiments, the vehicle inspection system can automatically analyze identification information associated with the vehicle (such as, the license plate) to identify the vehicle for inspection and add, for example automatically, data indicative of the identity of the vehicle to the associated vehicle inspection report.

Optionally, customized vehicle inspection information corresponding to the identified vehicle can be provided to the vehicle inspection system and/or the vehicle inspection report, based on the identity of the vehicle. The vehicle inspection system can provide an updated, revised, and/or customized vehicle inspection report including additional inspection information corresponding to the customized vehicle inspection information for use during the vehicle inspection. In some embodiments, the customized vehicle inspection information can be stored on the mobile computing device and/or it can be provided by a vehicle management system, which can be remote from the mobile device.

In some embodiments, the vehicle inspection system can utilize location information associated with the location of the operator device to identify the location of the operator at each check point of the inspection report. For example, as the operator checks off locations on an automated inspection report, the vehicle inspection system can record the location of the mobile computing device, for example, at the same or approximately the same moment at which the operator indicates an inspection point is complete (for example, by checking off a box). The vehicle inspection system can also associate position information with a captured image of the vehicle taken by the operator. For example, each time an image is captured by the operator device, the vehicle inspection system can record the location information at the time of capture.

In some embodiments, location information can be used in lieu of or in addition to image data captured by the operator during the vehicle inspection. For example, the mobile computing device can include a location device, such as a Global Positioning System (GPS) chip, that identifies the location of the operator device during the inspection report. As the operator inspects the vehicle, the location device can determine and record the location of the computing device to determine the location of the operator during the inspection. In some embodiments, the vehicle may be equipped one or more GPS devices. Optionally, a vehicle management system can be configured to determine the location of the operator relative to the location of the vehicle by comparing the location information of the operator with the location information of the vehicle.

In some embodiments, the vehicle management system can be configured to generate a virtual footprint of the vehicle based on the location information of the vehicle, which may be used for comparison of the location of the operator relative to the vehicle. In some embodiments, the mobile computing device of the operator can communicate with a location device on the vehicle in order to synchronize location information prior to communicating with the vehicle management system. In some embodiments, the location information from the operator and the vehicle can be transmitted separately to the vehicle management system for analysis. The operator device and/or the vehicle location device can provide the location information to the vehicle management system after the operator device provides an indication that the inspection report has been initiated.

The features described herein can be implemented to provide automated formatting, vehicle identification, data entry, verification, and/or analysis of vehicle inspection reports which can be delivered to a vehicle management system.

Vehicle Management System Overview

Figure 1B:
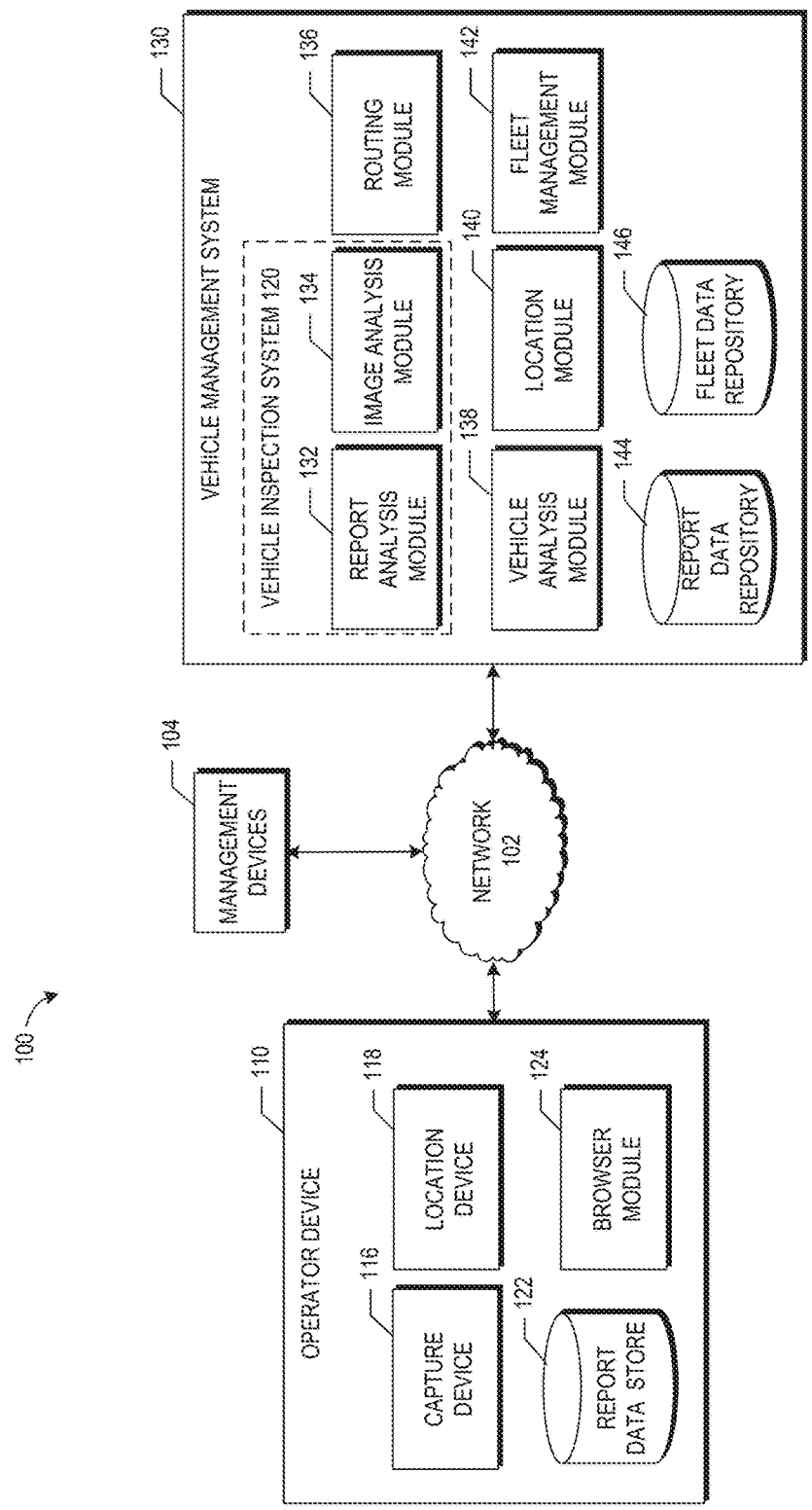

FIGS. 1A and 1B illustrate embodiments of a computing environment 100 which can be used for implementing a vehicle management system 130. Among other features, the vehicle management system 130 can provide an automated system for supporting a vehicle inspection, optionally including analyzing various aspects of vehicle inspection reports.

For example, the vehicle management system 130 can be configured to determine a type of vehicle to be inspected in accordance with a vehicle inspection report, provide customized vehicle inspection reports associated with the identified vehicle, and provide automatic analysis and verification that the vehicle inspection report was completed in accordance with the defined parameters of the vehicle inspection report.

In the illustrated computing environment 100, one or more operator devices 110 and management devices 104 communicate with the vehicle management system 130 over a network 102. The illustrated network 102 can be a LAN, a WAN, the Internet, combinations of the same, or the like. For ease of illustration, the vehicle management system 130 is depicted as a centralized system. However, in some implementations, at least some of the functionality of the vehicle management system 130 can be implemented in other devices. Other implementations of the vehicle management system 130 can include many more or fewer components than those shown in FIGS. 1A and 1B.

In some embodiments such as the embodiment illustrated in FIG. 1A, the vehicle inspection system 120 can be implemented at least in part on an operator device 110. In some embodiments, such as in the embodiment illustrated in FIG. 1B, the vehicle management system 130 can utilize a network-based interface for the vehicle inspection system 120, in which the operator device can communicate and interface with the vehicle inspection system 120 via a browser module 124.

Management Devices

The management devices 104 can be computing devices used by dispatchers, fleet managers, administrators, or other users to manage different aspects of the vehicle management system 130. For example, a user of a management device 104 can access the vehicle management system 130 to generate routes, dispatch vehicles and drivers, define access paths, select access paths, update site details information for a site, review vehicle report information, and perform other individual vehicle or fleet management functions. With the management devices 104, users can access and monitor information obtained from one or more of the operator devices 110 by the vehicle management system 130. In some embodiments, the management devices 104 are in fixed locations, such as at a dispatch center. The management devices 104 can also be used by administrators in the field, and may include mobile devices, laptops, tablets, smartphones, personal digital assistants (PDAs), desktops, or the like. The management device can use a management interface to access and manage the vehicle management system 130.

Operator Device

The operator device 110 can be any type of computing device, such as a smart phone or tablet computing device, and can be used by operators during vehicle inspections. The operator device 110 can include various modules that can be used to implement various aspects of the vehicle inspection system 120.

In the illustrated embodiment, the operator device 110 includes an image analysis module 112, a vehicle report module 114, a capture device 116, a location device 118, and a report data store 122. Various aspects of the vehicle inspection system 120 can be implemented in whole, or in part, by the operator device 110. In some embodiments, such as illustrated in FIG. 1B, the vehicle inspection system 120 can be remote from and communicate with the operator device 110 over the network 102 via a browser module 124 or other interface. For example, the vehicle inspection system 120 can be included in the vehicle management system 130 or another system remote from the operator device 110.

Image Analysis Module

The image analysis module 112 can be configured to analyze image data and extract information from images that are received from the vehicle management system 130 and/or captured by the operator device 110. The image analysis module 112 can be configured to analyze and interpret vehicle identification characteristics and output data corresponding to a partial or complete identification of a unique vehicle.

For example, the image analysis module 112 can be configured to recognize a radiator grill and headlight configuration as corresponding to a particular make, model, and year of a vehicle, and output data corresponding to the make, model, and year. As such, other data can be used to identify a unique vehicle associated with the received data image.

In some embodiments, the image analysis module 112 can be configured process the image data and use techniques, such as optical character recognition ("OCR") to identify information associated with vehicles. For example, the image analysis module 112 can identify vehicle identification information, such as indicia on a license plate using OCR. Thus, the image analysis module 112 can be configured to convert visual image data into text and/or numerals corresponding to those text and/or numerals on the license plate. The vehicle identification information identified by the image analysis module 112 can be used to identify a unique vehicle, for example, by communication with a fleet management repository 146 and/or a report data repository 144.

Other types of vehicle identification information can also be used for identification of the vehicles. For example, some non-limiting examples include a manufacturer vehicle identification number (VIN), a company vehicle identification number, manufacturer logos, model type identifiers (for example, F-150), the physical appearance of the vehicle (such as, for example, the paint color, body type, and the like), and/or other characteristics of the vehicle. In some embodiments, the vehicle identification information can be used to partially identify a vehicle. For example, the vehicle identification information can be used to generate a subset of vehicles that match the information (for example, white tractors) and then a user can select the appropriate vehicle from a list.

In some embodiments, the image analysis module 112 can be configured to output data extracted from the image data to the vehicle management system 130 for further analysis. Optionally, the operator device 110 can be configured to provide image data of the vehicle to the vehicle management system 130 and the information extracted from the image data. In some embodiments, the operator device 110 can be configured to provide image data of the vehicle to the vehicle management system 130 without analyzing or extracting information from the image data. The vehicle management system 130 can also be configured to analyze the image data and identify the vehicle.

Vehicle Report Module

The vehicle report module 114 can be configured to generate vehicle inspection reports for conducting inspections of vehicles. Such generated vehicle inspection reports can include information to be used by an operator for conducting an inspection. For example, such a vehicle inspection report can identify each inspection point, and provide instructions for conducting the inspection and submitting the report.

Optionally, the vehicle inspection report can have defined inspection parameters and reporting parameters. For example, the inspection parameters can define the type of inspection associated with the inspection point. The reporting parameters can define the type of action that the operator is requested to perform in order to complete inspection of an inspection point. Example embodiments of inspection reports are illustrated in FIGS. 3A, 3B, 5A, and 5B.

The vehicle report module 114 can be configured to generate and/or load a vehicle inspection report based at least in part on the vehicle identifier. The vehicle report module 114 can access information associated with the identified vehicle by communicating with the report data store 120, report data repository 144, and/or fleet data repository 146. The vehicle inspection report can be specific to the vehicle or a class of vehicles.

For example, a taxi cab can have a different vehicle inspection report than those configured for inspection of a tractor-trailer. In some embodiments, the vehicle inspection report can be generated by loading a template associated with a type of vehicle and populating data fields in the template based on the vehicle information associated with the identified vehicle.

The vehicle report module 114 can be configured to generate an interface for the operator to complete the vehicle inspection report. The vehicle report module 114 can provide the operator with instructions for inspection and verification of each item within the vehicle inspection report. For example, a report can include identifications of specific locations where a video or image of the vehicle is requested. Additionally, the vehicle report module 114 can receive and store additional information associated with the inspection, such as location information, in conjunction with report information.

Figure 3A:
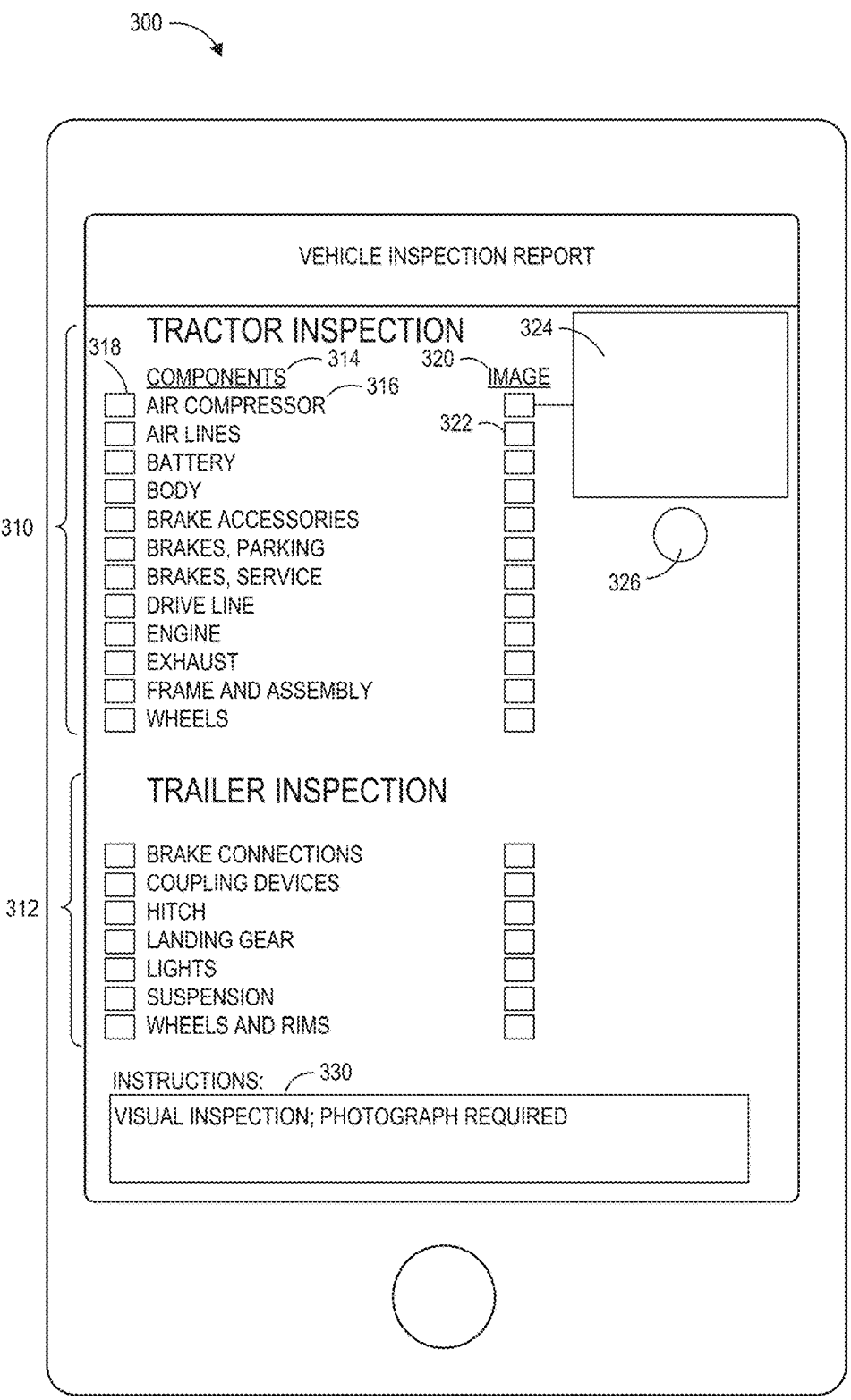

In some embodiments, the vehicle report module 114 can be configured to generate and load a vehicle inspection report similar to the vehicle inspection report illustrated in FIGS. 3A and 3B. In some embodiments, the vehicle report module 114 can be configured to use the identification information to automatically retrieve and populate a vehicle inspection report for the vehicle.

Figure 5A:
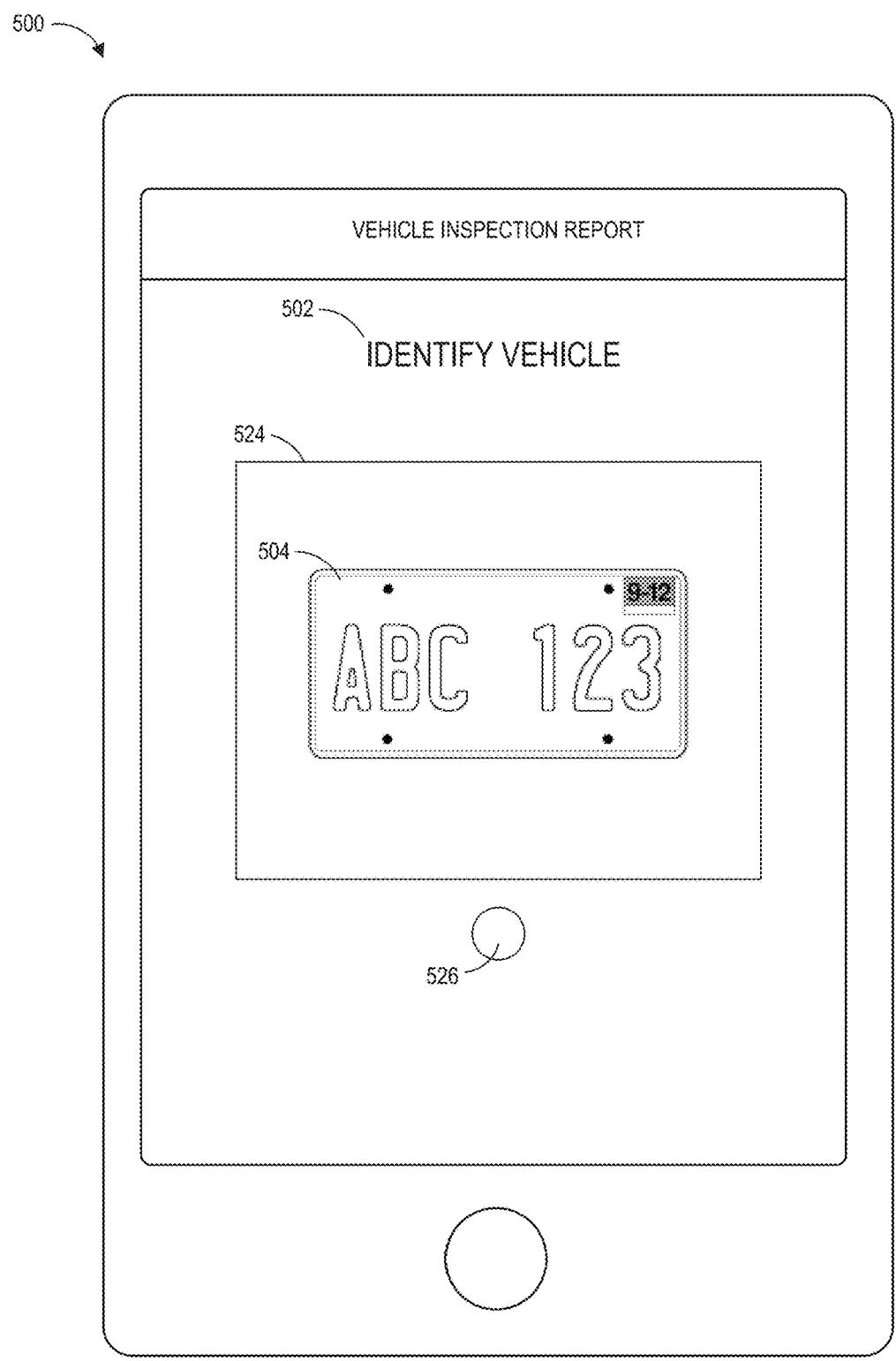
FIGS. 5A and 5B illustrate another embodiment of an interface for a vehicle inspection report.
Figure 5B:
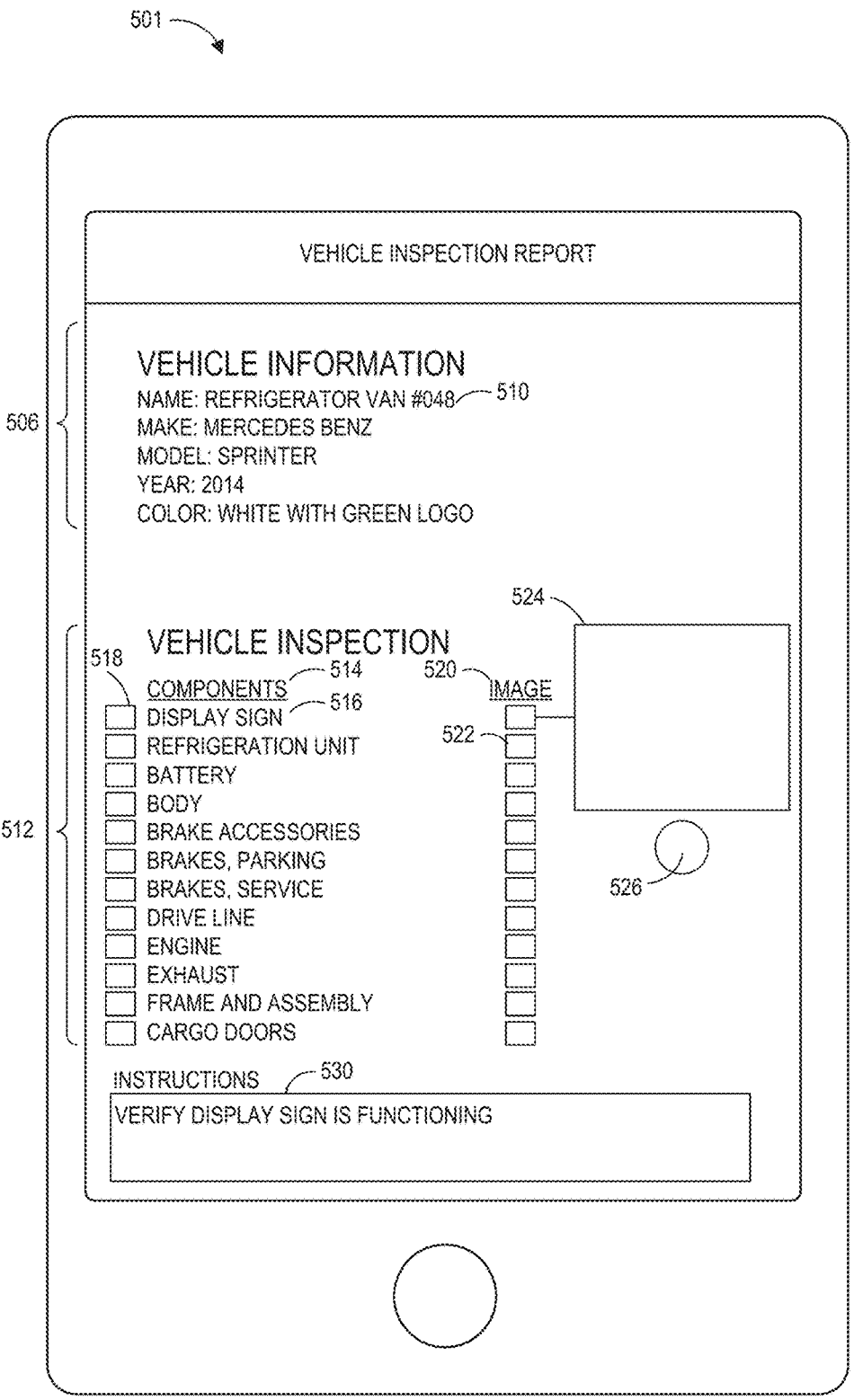

For example, the vehicle report module 114 can be configured to load a vehicle inspection report similar to the vehicle inspection report illustrated in FIGS. 5A and 5B. In some embodiments, the vehicle inspection report can include historical information from previous vehicle inspection reports. For example, the vehicle inspection report can include image data that was previously submitted. The operator thus has the option of using historical data and/or images to determine whether it is necessary to update the previously submitted data.

In some embodiments, the report module 114 can be configured to communicate with the vehicle management system 130 during run-time of the vehicle report module 114. For example, the report module 114 can be configured to provide the vehicle identification information as well as an indication of a start time of the inspection report, an end time, and other information that can be communicated to the vehicle management system 130. In some embodiments, the vehicle report module 114 can be configured to interface with a network-based application, such as a web app, provided by the vehicle management system 130 for implementation of various functions associated with the vehicle report module 114.

Capture Device

The capture device 116 can be a camera or other capture device that is configured to capture still images and/or video. The capture device 116 can be embedded in the operator device 110. In some embodiments, the capture device 116 is a separate device from the operator device 110, and, optionally, can be in wired or wireless communication with the operator device 110, using known data, and/or image transfer techniques.

Location Device

The location device 118 can be a GPS device or other similar location device 118 that can be used to identify a location of the operator device 110. The location information can be provided and recorded automatically during operation of the operator device 110. In some embodiments, the location information may be recorded periodically, aperiodically, recorded based on triggering events (such as capturing an image), and/or recorded based on another defined criteria. For example, in some embodiments the location device 118 can be configured to provide location information that can be embedded within images and/or video information that can be used to identify the location of the operator device 110 during image and/or video capture.

Report Data Store

The report data store 122 can store information associated with vehicle inspection reports. The information can include vehicle inspection report information associated with the generation of vehicle inspection reports, such as, for example, vehicle inspection report templates, vehicle inspection reports associated with specific vehicles, vehicle inspection report parameters and instruction information, and/or other types of information associated with vehicle inspection reports. The report data store 122 can also store historical vehicle inspection report information, such as, for example, completed vehicle inspection reports, data associated with the inspection reports, including image data, video data, location data, time and date information, and/or other types of information. In some embodiments, the report data store can store the information temporarily until it can be provided to the vehicle management system 130. In some embodiments, the information associated with the vehicle inspection reports is stored on the vehicle management server and not locally in the report data store on the operator device. For example, the information can be stored in the report data repository 144 and/or the fleet data repository 146.

Vehicle Management System

The vehicle management system 130 can be implemented by one or more physical computing devices, such as servers. Such servers can be physically co-located or can be geographically separate, for example, in different data centers. In some embodiments, the vehicle management system 130 can be implemented as a cloud, or network-based, computing application. For instance, the vehicle management system 130 can be a cloud-implemented platform hosted in one or more virtual servers and/or physical servers accessible to users over the Internet or other network 102.

In the depicted embodiment, the vehicle management system 130 includes a vehicle analysis module 132, an image analysis module 134, a routing module 136, a report analysis module 132, a location module 140, a fleet management module 142, report data repository 144, and a fleet data repository 146. In some embodiments, the vehicle management can include more or fewer components than those illustrated in FIGS. 1A and 1B.

Image Analysis Module

The image analysis module 134 can be configured to analyze image data and extract information from images that are received by the vehicle management system 130 and/or captured by the operator device 110. The image analysis module 112 can be configured to analyze and interpret the vehicle identification characteristics and output data corresponding to a partial or complete identification of a unique vehicle. The identification characteristics can include shape, color, appearance, and/or other physical characteristics of a vehicle.

In some embodiments, the image analysis module 112 can be configured to process the image data and use techniques, such as OCR, which can be used to identify information associated with vehicles. For example, the image analysis module 112 can identify vehicle identification information, such as indicia on a license plate using OCR. The vehicle identification information identified by the image analysis module 112 can be used to identify a unique vehicle, for example, by communication with a fleet management repository 146 and/or a report data repository 144.

Other types of vehicle identification information can also be used for identification of the vehicles. For example, some non-limiting examples include a manufacturer vehicle identification number (VIN), a company vehicle identification number, the physical appearance of the vehicle (such as, for example, the paint color, body type, and the like), and/or other characteristics of the vehicle.

Report Analysis Module

The report analysis module 132 can be configured to generate vehicle inspection reports for conducting inspections of vehicles provide to that of the vehicle report module 114. In some embodiments, such as in the network-based application illustrated in FIG. 1B, the report analysis module 132 can be configured to be configured to perform some or all of the functionality associated with the vehicle report module 114.

Additionally, the report analysis module 132 can be used to further analyze report information that is provided by the vehicle inspection system 120. The report analysis module 132 can automatically determine whether a completed vehicle inspection report is in accordance with defined parameters of the vehicle inspection report.

Each vehicle inspection report can have defined inspection parameters and reporting parameters. The inspection parameters can define the type of inspection associated with the inspection point. The reporting parameters define the type of action that the operator needs to perform in order to complete inspection of an inspection point.

The report analysis module 132 can be configured to analyze vehicle inspection reports received from an operator device 110 and automatically determine whether to accept, reject, or perform another management function associated with a completed vehicle inspection report. For example, the report analysis module 132 can be configured to reject a received vehicle inspection report because the operator did not take a sufficient amount of time to conduct the inspection. In another optional embodiment, the report analysis module 132 can be configured to reject a vehicle inspection report if the operator was not within a defined proximity of the vehicle when a portion or all of the vehicle inspection report was completed.

In some embodiments, the report analysis module 132 can be configured to communicate directly with the vehicle inspection system 120 and provide updates during the inspection of the vehicle by the operator. For example, the report analysis module 132 can indicate that information received from the operator device 110 has been verified and accepted. In some embodiments, the report analysis module can request additional information and/or additional inspection.

Location Module

The location module 140 can be used to determine the location of the vehicle and/or the operator devices. In some embodiments, the location module 140 can also be used to generate a virtual footprint and/or representation of a vehicle based on location information received from one or more in-vehicle devices, such as GPS devices.

In some embodiments, the location module 140 can be in communication with a hub device (such as the gateway device 800 illustrated in FIG. 8) that can provide GPS or other location information associated with the vehicle. In some embodiments, the location of the operator device can be compared to the location of the vehicle to verify that the operator is within defined distance thresholds during inspection of the vehicle.

Fleet Management Module

The fleet management module 142 can include functionality for generating, rendering, or otherwise displaying a vehicle management user interface. The vehicle management user interface can include a map or list of vehicles that depicts symbols or other data representative of vehicles. The fleet management module 142 can obtain mapping data, which the fleet management module 142 can include in the vehicle management user interface. The mapping data can be compressed, transmitted, re-rendered, and displayed on the management user interface.

The fleet management module 142 can also access vehicle status data based on telematics data obtained from in-vehicle devices. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

As used herein, the terms "output a user interface for presentation to a user," "presenting a user interface to a user," and the like, in addition to having their ordinary meaning, can also mean (among other things) transmitting user interface information over a network, such that a computing device can actually display the user interface.

Routing Module

The routing module 136 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. The routing module 136 can automatically select routes that take into account factors that affect energy usage using the techniques described in U.S. Publication No. 2011/0238457, filed Nov. 24, 2010, and entitled "Vehicle Route Selection Based on Energy Usage," the disclosure of which is hereby incorporated by reference in its entirety. In some embodiments, the routing module can utilize information associated with the vehicle inspection reports to as factors in determining routing.

Vehicle Analysis Module

The vehicle analysis module 138 can be configured to analyze information associated with vehicles to determine the operational data and other information that is provided by the operator as well as information such as telematics information that is provided by the vehicle. For example, the vehicle may have operational sensors that are installed which can transmit information to the vehicle management system about the operation of the vehicle.

Report Data Repository

The report data repository 144 can store information associated with vehicle inspection reports. The information can include vehicle inspection report information associated with the generation of vehicle inspection reports, such as, for example, vehicle inspection report templates, vehicle inspection reports associated with specific vehicles, vehicle inspection report parameters and instruction information, and/or other types of information associated with vehicle inspection reports. The report data store 122 can also store historical vehicle inspection report information, such as, for example, completed vehicle inspection reports, data associated with the inspection reports, including image data, video data, location data, time and date information, and/or other types of information. The report data repository 144 can maintain historical data associated with the vehicles. For example, the historical data may include all vehicle report information associated with a vehicle. In some embodiments, the historical information may only be maintained for a defined period of time.

Fleet Data Repository

The fleet data repository 144 may include any type of information that is collected by particular vehicle fleet, or its users. In some cases, the fleet data repository 144 may include a copy of at least some of the information stored that is accessible by users (e.g., drivers or dispatch operators) of the particular vehicle fleet.

Although the report data repository 144 and the fleet data repository 146 are illustrated as being part of the vehicle management system 130, in some embodiments one or more of the repositories may be separate systems, which may or may not be affiliated with separate entities. In some embodiments, different entities may be associated with or in control of separate vehicle management systems 130. Each of these entities or vehicle management systems 130 may have access to a single shared report data repository 144 that is implemented in a system separate from the vehicle management systems 130. Similarly, the fleet data repository 146 may be shared among vehicle management systems 130. Alternatively, one or more of the vehicle management systems 130 may have its own fleet data repository 146.

Vehicle Inspection Points

Figure 2:
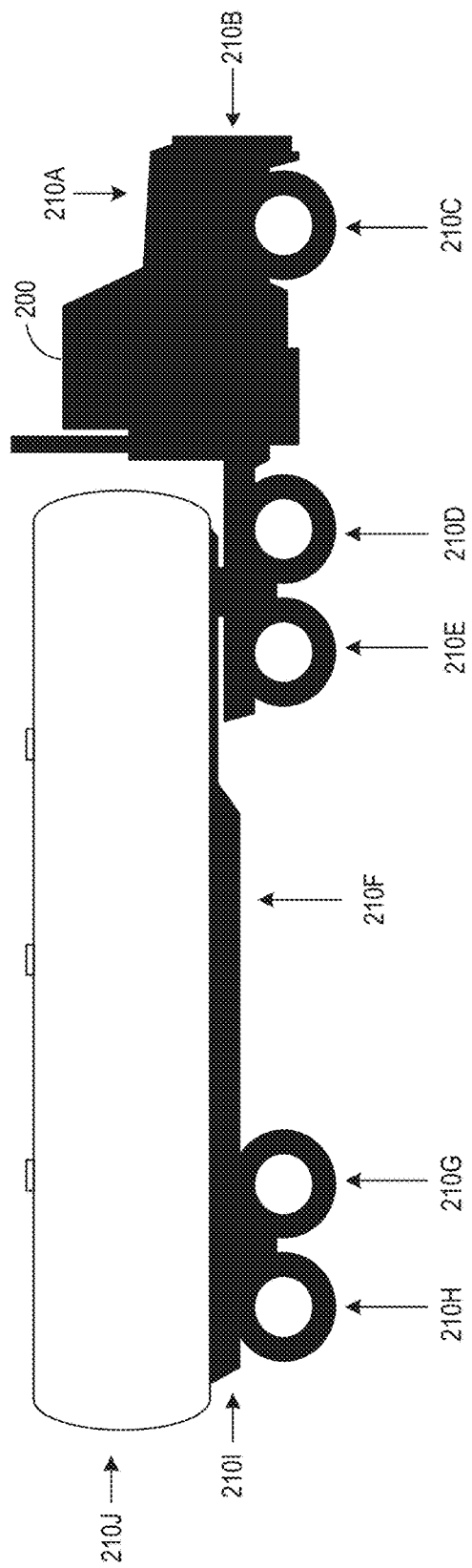
FIG. 2 illustrates an embodiment of a vehicle having a plurality of inspection points.

FIG. 2 illustrates an embodiment of a vehicle 200 that includes a plurality of inspection points 210A-210J. The inspection points 210A-210J are generally referred to herein with the reference numeral 210.

Each inspection point 210 can represent a location and/or component of the vehicle 200 that requires inspection. In the illustrated embodiment, the vehicle 200 has a plurality of inspection points, including the engine 210A, license plate 210B, wheels 210C-210E, 210G, 210H, the undercarriage of the trailer 210F, and the rear of the trailer 2101, 210J. The vehicle 200 may also include various other inspection points not illustrated in FIG. 2A. For example, the vehicle may include inspection location within the cab of the vehicle 200 or that are not within the illustrated view.

The location and number of inspection points 210 can be different for each vehicle. For example, a cargo van can have different inspection points than a tractor-trailer. Example embodiments of vehicle inspection reports identifying various inspection points are illustrated in FIGS. 3A, 3B, 5A, and 5B.

Each inspection point 210 on a vehicle can be associated with pre-defined inspection parameters and/or reporting parameters. The inspection and reporting parameters associated with each inspection point 210 on a vehicle can be stored within the report data sore 122, the report data repository 144, and/or other locations. The inspection parameters can be considered as defining the type of inspection associated with the inspection point. For example, a battery may only require a visual inspection, whereas tires may need to be visually inspected and the tire pressure of each tire measured. In some embodiments, the inspection and/or reporting parameters can be based on the age of a component. In such an embodiment, the type of inspection and/or reporting requirements, can be based on the amount of time the component has been on the vehicle, the number of miles traveled, or another age-based metric that can be incorporated into the inspection parameters and/or reporting parameters. In some embodiments, additional information can be associated with one or more inspection points for an identified vehicle. For example, additional inspection may be required after installation of a component to determine whether the component was properly installed.

The reporting parameters can be considered as defining the type of action that the operator needs to perform in order to complete the vehicle inspection report. For example, some inspection points may require that the operator capture an image of a component or location. Some inspection points may not have image requirements and may only require that the operator confirm that the inspection point was inspected. In some embodiments, the inspection point may optionally include a proximity requirement, in addition to, or in lieu of, other requirements. A proximity requirement can require that the operator device is within a defined distance of the inspection point in order to complete the inspection. In some embodiments, a time requirement may be associated with an inspection point 210.

For example, a time requirement can include parameters indicating that that the operator stay within a defined area relative to the inspection point for a threshold amount of time prior to moving to the next inspection point. In some embodiments, the time requirement may be based on the total amount of time that it takes to complete the inspection report or the amount of time between inspection events. For example, the time requirement may be used to determine whether the operator is spending adequate time inspecting the vehicle.

Vehicle Inspection Reports

FIGS. 3A and 3B illustrate an embodiment of an interface of a vehicle inspection report 300 configured to be displayed on an operator device 110. In the illustrated embodiment, the vehicle inspection report 300 is divided between the tractor inspection section 310 and the trailer inspection section 312. FIGS. 3A and 3B provide example interfaces and do not limit the scope of an interface for a vehicle inspection report. An interface for a vehicle inspection report can be configured and designed based on the specific constraints of vehicle inspection requirements, management requirements, vehicle type, operator requirements, safety requirements, and/or other constraints associated with a vehicle inspection report and interface.

The sections 310 and 312 can include a components section 314, which identifies the specific components 316 to be inspected at each inspection point, a completion input box 318. The completion input box can receive input from the operator indicating that an inspection point has been completed. For example, the operator device 110 and vehicle inspection report 300 can be configured to detect and/or receive a screen touch or pointer click at the location of the box 318, then in response to such a detection, generate a visual change of the box 318.

In some embodiments, the completion input box 318 may be automatically checked based information received by the operator device and/or other actions performed by the operator. For example, the vehicle report module may update the input based on an indication received from the vehicle management system 130 that the operator has recorded an image associated with the inspection point. In some embodiments, the vehicle report module 114 can optionally automatically update an input associated with an inspection point if the operator device moved within a defined proximity of an inspection point.

In some embodiments, the interface provides an image section 320 that provides input elements for controlling the operation of a capture device 116. A viewfinder 324 and camera control input 326 can allow the operator to capture an image without switching between the vehicle inspection report and a camera application. With specific reference to FIG. 3B, a plurality of the inspection locations have been completed and a viewfinder element 324 is illustrating an image 328 prior to capture.

In the illustrated embodiment, the viewfinder 324 is configured to be centered on the current inspection point. However, in other embodiments, the viewfinder 324 may be configured differently. In some embodiments, the viewfinder 324 may take up a larger portion of the screen. For example, the viewfinder 324 may be the entire background of the interface. In some embodiments, the vehicle inspection report can automatically transition to a camera application on the operator computing device, and then transition back to the report interface after the image and/or video has been captured.

After an image has been captured, the application and/or the operator can provide an indication 322 that the image has been recorded. The inspection report 300 can also include instructions 330 indicating inspection and/or reporting parameters associated with the inspection point. In some embodiments, the instructions 330 may indicate that the same image can be used for multiple inspection points. For example, an image of the engine may include the battery and other aspects of the engine that need to be inspected.

The inspection report 300 can be sequentially ordered based on anticipated travel path of the operator relative to the vehicle. For example, the inspection can start at the license plate at the front of the vehicle and the operator can walk around the vehicle and follow a sequential travel plan that is defined by the vehicle inspection report.

The operator vehicle inspection report can be configured to receive and/or store further inputs, for example, notes or comments associated with each inspection point. In some embodiments, the images captured by the operator can include additional information, such as location information, time information, date information, orientation information of the operator device and/or other information. In some embodiments, a user can provide visual indications (for example, circles or other markings) and/or comments directly on an image to identify a point of interest (for example, an area of concern). The additional information can be stored with the vehicle inspection report, and can optionally be associated with a specific inspection location. In some embodiments, the additional information can be recorded based on when the user provides input to the operator device. For example, the operator device can record the time and location when an operator provides input that an inspection point has been inspected.

Vehicle Inspection Monitoring

Figure 4:
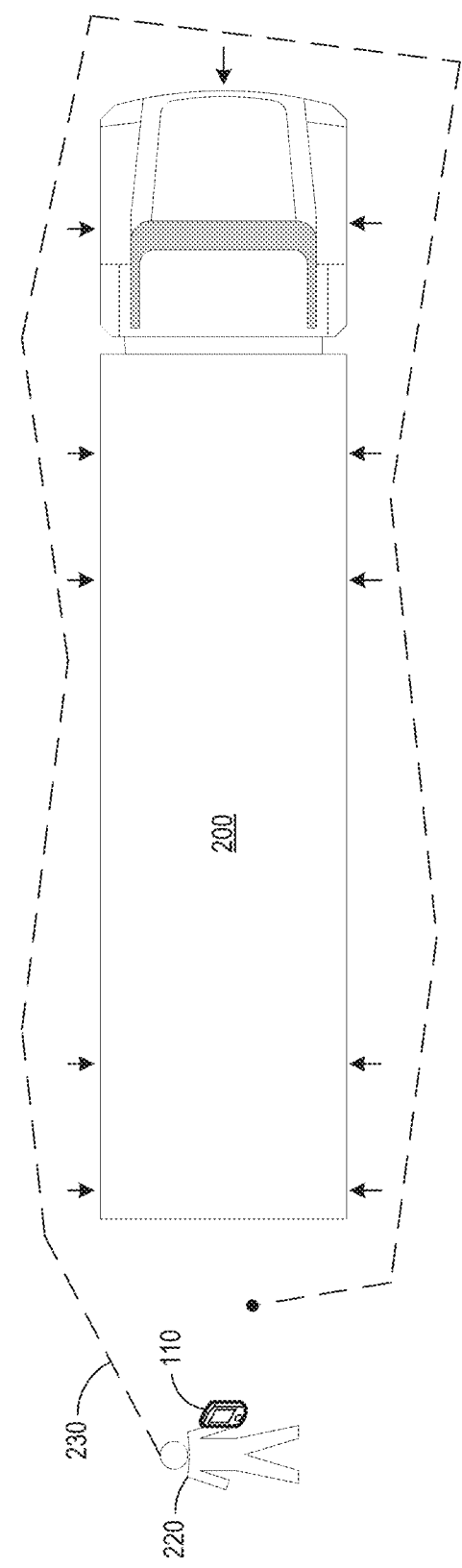
FIG. 4 illustrates an embodiment of vehicle comprising a plurality of inspection locations and an inspection path of an operator performing a vehicle inspection.

FIG. 4 illustrates an inspection path 230 taken by an operator 220 equipped with an operator device 110. The operator path 230 illustrates a path an operator could take to inspect the vehicle 200. During the inspection, the operator device can include time information associated with the inspection. The time information may include a start time of the inspection and an end time of the inspection. The time information may also include a time stamp each time the user indicates that an inspection point has been inspected. The operator device may also include the location information associated with the inspection. In some embodiments, the vehicle inspection system can analyze the location information to determine whether the inspection path 230 would have encompassed the entire vehicle.

Automated Vehicle Identification

FIGS. 5A and 5B illustrate another embodiment of an interface 500 for a vehicle inspection report. In some embodiments, the vehicle inspection system 120 provides a first interface 500 that can be used to capture image data for identification of a vehicle.

For example, the interface 500 can include a vehicle identification section 520 that can include a viewfinder for 524 for the capture device 116 and a capture device control input 526. In the illustrated embodiment, a license plate 504 is the image being captured. The vehicle identification information on the license plate 504 can be used to identify the vehicle.

In some embodiments, the vehicle identification information can be a manufacturer vehicle identification number (VIN), a company provided vehicle identification number, an aspect of the physical appearance of the vehicle, and other characteristics of the vehicle that can be used for automatic identification of the vehicle. The image analysis module 112 can be configured to process the captured image to programmatically obtain the vehicle identifier. For example, the image analysis module 112 can be configured to use an OCR algorithm to identify the characters within the image. In some embodiments, the captured image can be provided to the vehicle management system 130 for analysis by the image analysis module 134 in order to obtain the vehicle identifier.

In some embodiments, the vehicle identifier can be provided to the vehicle management system 130. The vehicle analysis module 138 can be configured to identify the vehicle and generate or retrieve a vehicle specific vehicle inspection report. In some embodiments, the vehicle inspection report is based on a report template that can include data fields that are automatically populated with vehicle information.

An example of an interface 501 for a vehicle report with vehicle specific information is illustrated in FIG. 5B. In some embodiments, the vehicle specific vehicle inspection report 501 can be retrieved from the report data store 120 on the operator device 110 without communicating with the vehicle management system 130. The vehicle specific vehicle inspection report 501 can include a vehicle information section 506 and a vehicle inspection section 512. The vehicle information section 506 can include vehicle specific information 510. In some embodiments, historical image data from previous inspection reports can be included with the vehicle inspection report. Optionally, the report 501 can include parameters or instructions that the image data only needs to be updated if there is a change to the components at an inspection point, at the discretion of the operator.

Additionally, the vehicle inspection section 512 can include inspection information for the type of vehicle being inspected. The vehicle inspection section 512 can include a components section 514, which identifies the specific components 516 to be inspected at each inspection point. A box 518 or other user input element that provides the operator with the ability to indicate when an inspection point is completed. The interface 501 includes an instruction section 530, an image section 520, user inputs 522, a viewfinder for 524 for the capture device, and a capture device control input 526.

Vehicle Inspection Routine

Figure 6:
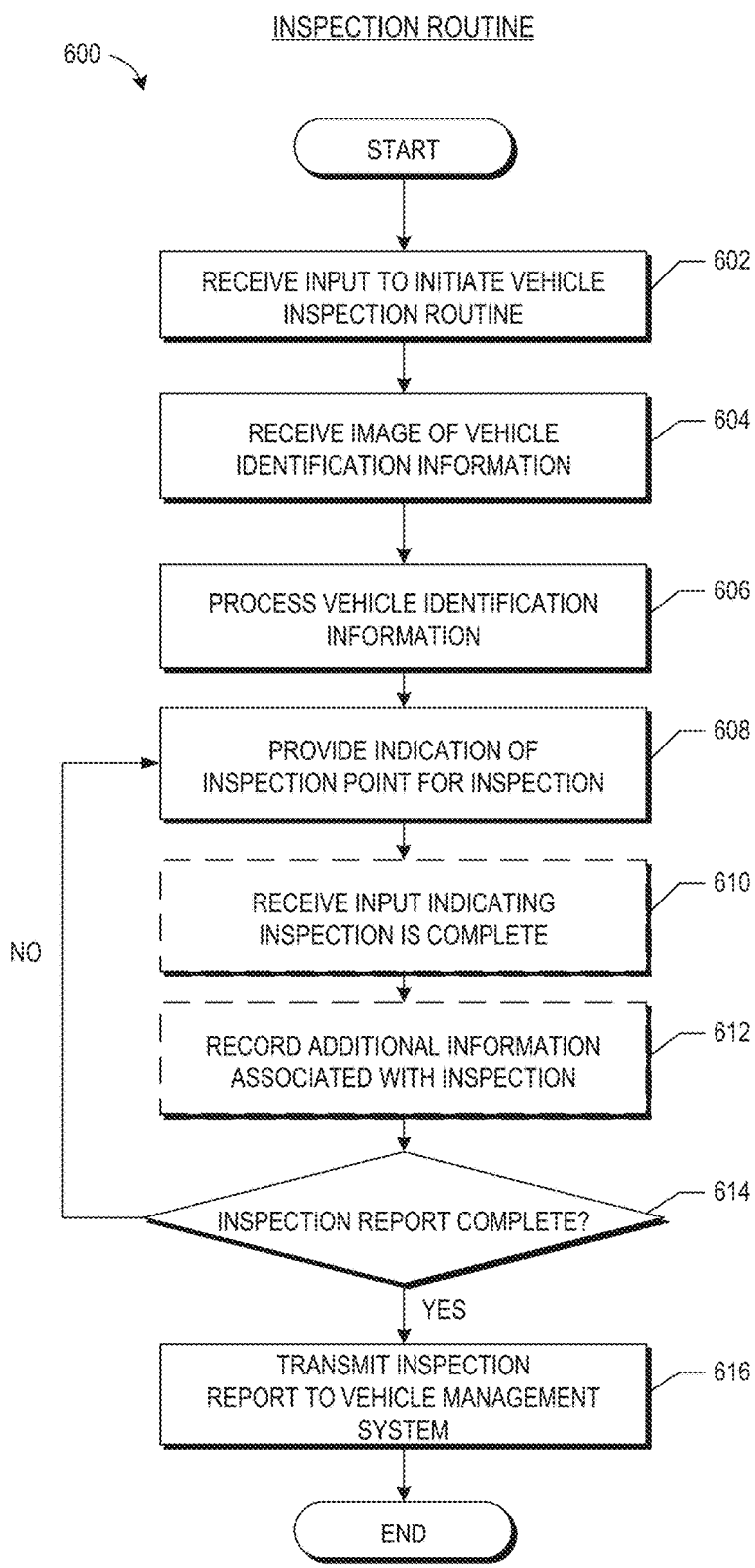
FIG. 6 illustrates an embodiment of a flowchart for a vehicle inspection routine.

FIG. 6 illustrates a flowchart representing an embodiment of a process for a vehicle inspection routine 600. The process 600 can be implemented by any mobile computing device that can communicate with the vehicle management system 130. For example, the process 600, in whole or in part, can be implemented by the operator device 110, the vehicle inspection system 120, the vehicle report module 114, the image analysis module 112, the vehicle management system 130, the image analysis module 134, or the report analysis module 132, or other computing devices or modules. Although any number of systems, in whole or in part, can implement the process 600, to simplify the discussion, portions of the process 600 will be described with reference to particular systems. The inspection routine 600 starts with initiating the vehicle inspection routine At block 602, input is received to initiate a vehicle inspection. For example, the operator device 110 can receive an input to initiate a vehicle inspection routine. An operator may initiate the inspection routine on operator device 110. In some embodiments, the operator device 110 can provide a notification to the operator to initiate the inspection based on the location of the vehicle, a stage in an operator's workflow, a time of day, as part of a random audit, and/or based on another criteria used to initiate a vehicle inspection that needs to be performed by the operator.

At block 604, image data comprising vehicle identification information can be received. For example, the operator device 110 can receive image data comprising vehicle identification information. The vehicle identification information can be a license plate number, a manufacturer vehicle identification number, a company provided vehicle identification number, an aspect of the physical appearance of the vehicle, and other characteristics of the vehicle that can be used for automatic identification of the vehicle. In some embodiments, the image data may be captured by a capture device 116 of the operator device 110.

At block 606, the vehicle identification information is processed in order to identify the vehicle. In some embodiments, the image analysis module 112 of the operator device 110 can process the vehicle identification information using image processing techniques, such as OCR. In some embodiments, the vehicle identification information may be provided to the vehicle management system 130 for processing by the image analysis module 134. The vehicle management server can identify the vehicle based on the image data. The vehicle management system 130 can provide the vehicle identification information to the operator device 110.

The vehicle inspection system 120 can access and/or generate a vehicle inspection report based on the vehicle identification information. In some embodiments, vehicle inspection report can be retrieved and at least partially populated, based on the vehicle identification information, from the report data store 122, the report data repository 144, and/or the fleet data repository 146. In some embodiments, the vehicle identification information can be used to partially identify a vehicle. For example, the vehicle identification information can be used to generate a subset of vehicles that match the information (for example, white tractors) and then a user can select the appropriate vehicle from a list. In some embodiments, the operator can manually select the vehicle inspection report for the vehicle if the vehicle cannot be automatically identified. Identification of a vehicle associated with a specific vehicle or class of vehicles can help reduce and/or eliminate the usage of vehicle inspection reports that include inspection points that are unrelated to the inspection of the operator's vehicle.

In some embodiments, the vehicle inspection report can be automatically populated with information based on the identification received from the vehicle. The operator computing device can be in communication with a vehicle computer, gateway module, vehicle sensors, and/or the vehicle management system to receive information associated with the operation of the vehicle. For example, the information can include current tire pressure, engine temperature, trailer temperature, and/or other information associated with the operation and inspection of the vehicle.

At block 608, the vehicle inspection report provides an indication of an inspection point that requires inspection. In some embodiments such as the embodiment illustrated in FIGS. 3A and 3B, a plurality of inspection points may be displayed in a single interface. In some embodiments, only a single inspection point may be displayed at a time. The vehicle inspection system 120 can include a visual indication such as highlighting or other visual indications that indicate the next inspection point. The interface can also include instructions identifying the type of inspection that needs to be performed at a specific inspection point. In some embodiments, the vehicle can have a sticker or other physical indicator identifying location of the inspection point on the vehicle. The sticker or other physical indicator can also provide a defined focal point for an image capture of the component.

At block 610, the vehicle inspection system 120 receives an indication that the inspection of the inspection point is complete. The indication may be automatically generated, such as based on the capture of image and/or video data, or may be a manual input by the operator indicating the inspection has been completed. In some embodiments, the vehicle inspection system 120 communicates with the vehicle management system 130 during the inspection. For example, the vehicle inspection system 120 can provide the vehicle management system 130 with updates throughout the inspection.

At block 612, the operator device 110 can record additional information associated with the inspection point. For example, the vehicle inspection system 120 can be configured to record information such as location, time, date information, device orientation information, and other information, which may be collected by the operator device. The information can be used to verify that the reporting parameters associated with the inspection point have been satisfied. The recording of additional information can occur contemporaneously with an image capture event, the receipt of input from the operator, and/or any other triggering event. For example, such information can be associated with one or more vehicle inspection locations in the vehicle inspection report.

At block 614, the vehicle inspection system 120 can determine whether the inspection report is complete. If additional inspection points require inspection, the process can return to block 608 where the next indication is provided to the operator for the next inspection point. If no additional inspection points are required, the inspection report can proceed to transmit the report at block 616.

In some embodiments, the vehicle inspection system 120 can determine if the reporting parameters associated with the inspection points have been satisfied. In such an embodiment, if a reporting parameter is not satisfied, the vehicle inspection system 120 can be configured to require the operator to re-inspect the identified inspection point. In some embodiments, the reporting parameters are analyzed by the vehicle management system 130.

At block 616, the vehicle inspection report can be provided to the vehicle management system 130. In some embodiments, the report can be stored locally as well as provided to the vehicle management server 130. In some embodiments, depending on the bandwidth or communication capabilities of the operator device 110, the report or a summary of the report can be provided without providing a complete copy of all the information associated with the vehicle inspection report. For example, the computing device 110 can be configured to store that information locally which can then be synchronized with the vehicle management system 130 when the operator device 110 has the sufficient communication capabilities.

Location-Based Vehicle Inspection

Figure 7A:
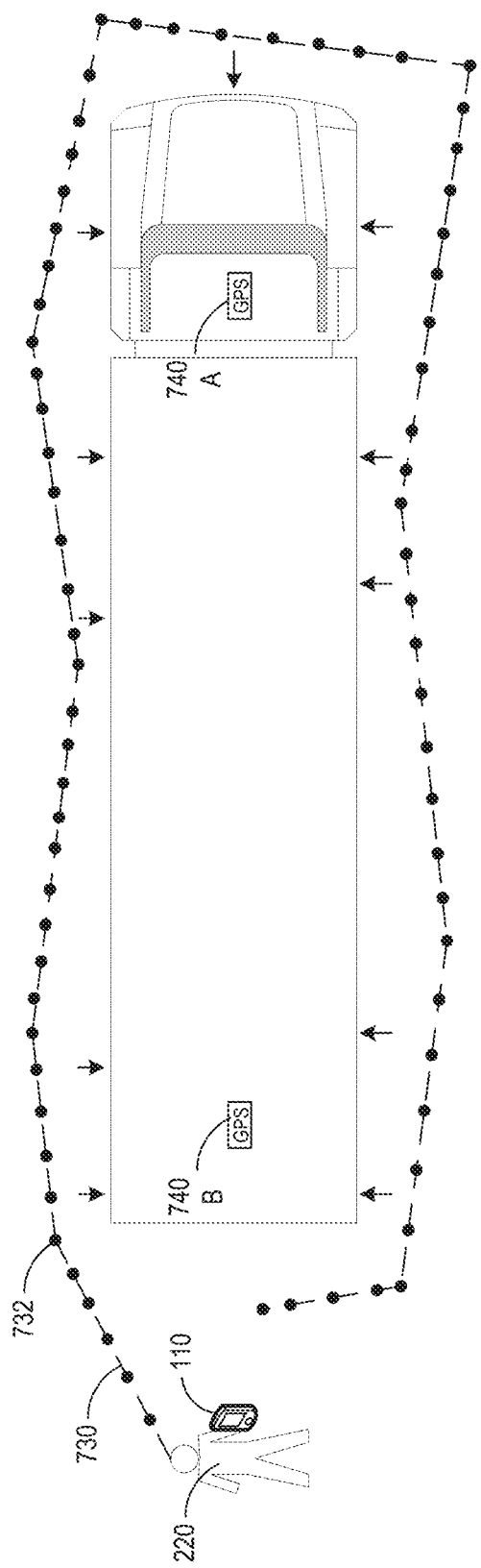
FIG. 7A illustrates an embodiment of vehicle comprising GPS devices and a plurality of inspection locations.
Figure 7B:
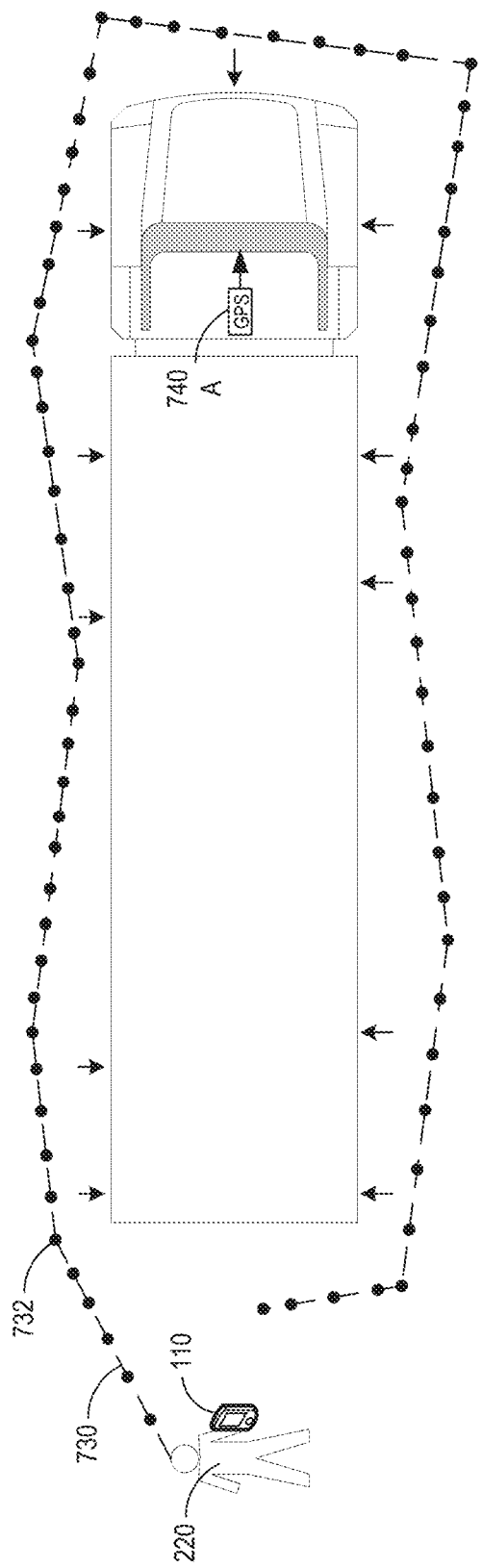
FIG. 7B illustrates another embodiment of vehicle comprising a GPS device and a plurality of inspection locations.

FIGS. 7A and 7B illustrate various embodiments of a location-based vehicle inspection system. In a location-based vehicle inspection system, location information associated with an operator device can be used to determine whether the vehicle inspection report have been completed by the operator. The vehicle inspection system 120 can use a location device 118 of the operator device 110 to detect and/or record the location of the operator device 110, which indicates the location of the operator 220. The path of the operator device 110 is illustrated by path 730, nodes 732 are indicative of location information being recorded by the operator device. For example, nodes 732 can represent locations identified by the location device 118, which can be in the form of a GPS device, during an inspection. Optionally, the nodes 732 can be connected with a line, as illustrated by path 730, as a representation of a likely path of movement of an operator during an inspection.

In the embodiment in FIG. 7A, the vehicle has two GPS units 740A and 740B which can be used to determine the orientation and position of the vehicle. In FIG. 7B, the vehicle uses a single GPS device and directional heading information associated with the GPS device in order to determine a position and orientation of the vehicle. For example, if the vehicle is stopped, directional heading can be based on a last known directional heading. Based on location information and vehicle information, the vehicle management system 130 can reconstruct a virtual footprint or a virtual model of the vehicle. The location information associated with the nodes 732 of the path 730 of the operator device 110 can be compared to the location information of the vehicle 200 to determine location of the operator 220 relative to the vehicle 200.

In some embodiments, the GPS location data may have an offset which may need to be triangulated or otherwise modified or processed in order to determine the location of the operator relative to the vehicle. By using multiple GPS devices the orientation of the vehicle can be more accurately determined.

Gateway Module

Figure 8:
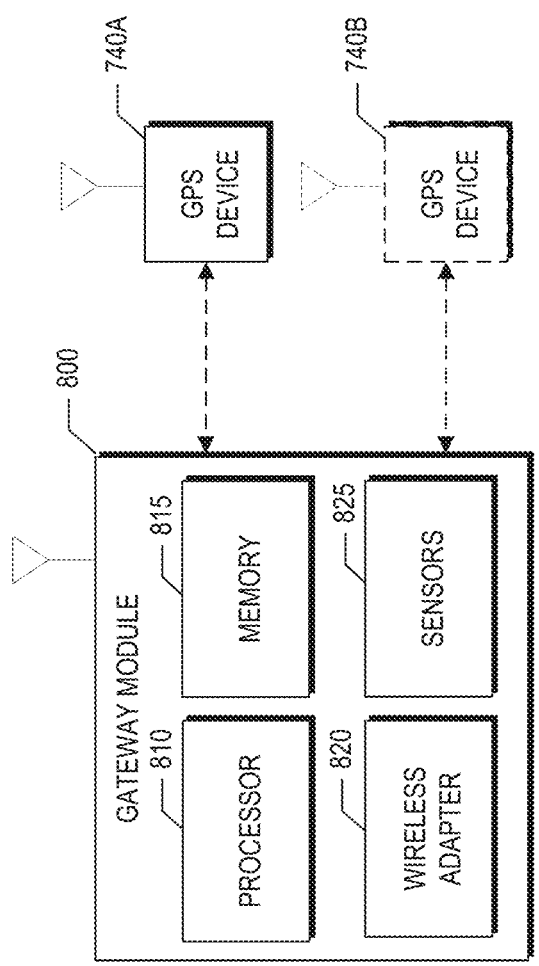
FIG. 8 illustrates an embodiment of a gateway module for a vehicle.

FIG. 8 illustrates an embodiment of a gateway module 800, also referred to as a gateway device or a vehicle hub. The gateway module 800 can be a vehicle based data acquisition and transmission system. In the depicted embodiment, the gateway module 800 includes a processor 810, memory 815, a wireless adapter 820, and one or more sensors 825. The sensors 825 can measure vehicle data, such as vehicle position, temperature, time, acceleration, audio, and direction. In some embodiments, the sensors 825 can be omitted. In some embodiments, the vehicle data provided by the gateway module 800 to the vehicle management server 130 can be used to update and or modify information associated with one or more vehicle inspection reports. For example, the vehicle data can be used to update a specific vehicle inspection report indicating that a specific component needs to be inspected or provide contemporaneous information about a component (e.g., tire pressure). The vehicle data could also be used to update parameters associated with a plurality of vehicles, a class of vehicles, and/or general vehicle reporting parameters. For example, the vehicle management server can aggregate the vehicle data to help determine inspections that need to be performed during the life of a component.

The gateway module 800 can be in communication with one or more GPS devices 730A, 730B (generally referred to as 730) via a wireless or a wired connection (for example, with a serial cable or the like). The GPS device 730 can detect vehicle position. In some embodiments, the there are two GPS devices 730A-B.

The gateway module 800 can be used to provide location information to the vehicle management system 130 from the one or more GPS devices. For example, a first and second GPS devices 730A-B can communicate with the gateway module 800, which can provide location information to the vehicle management server 130. In some embodiments, the GPS devices can be configured to transmit location information directly to the vehicle management system 130 without communicating with the gateway module 800.

In some embodiments, the gateway module 800 can be configured to communicate directly with the operator device 110. The operator device 110 and the gateway module 800 can be configured to synchronize location information prior to initiating a vehicle inspection routine. In some embodiments, a GPS device 730 can be included in the gateway module 800.

Location-Based Inspection Routine

Figure 9:
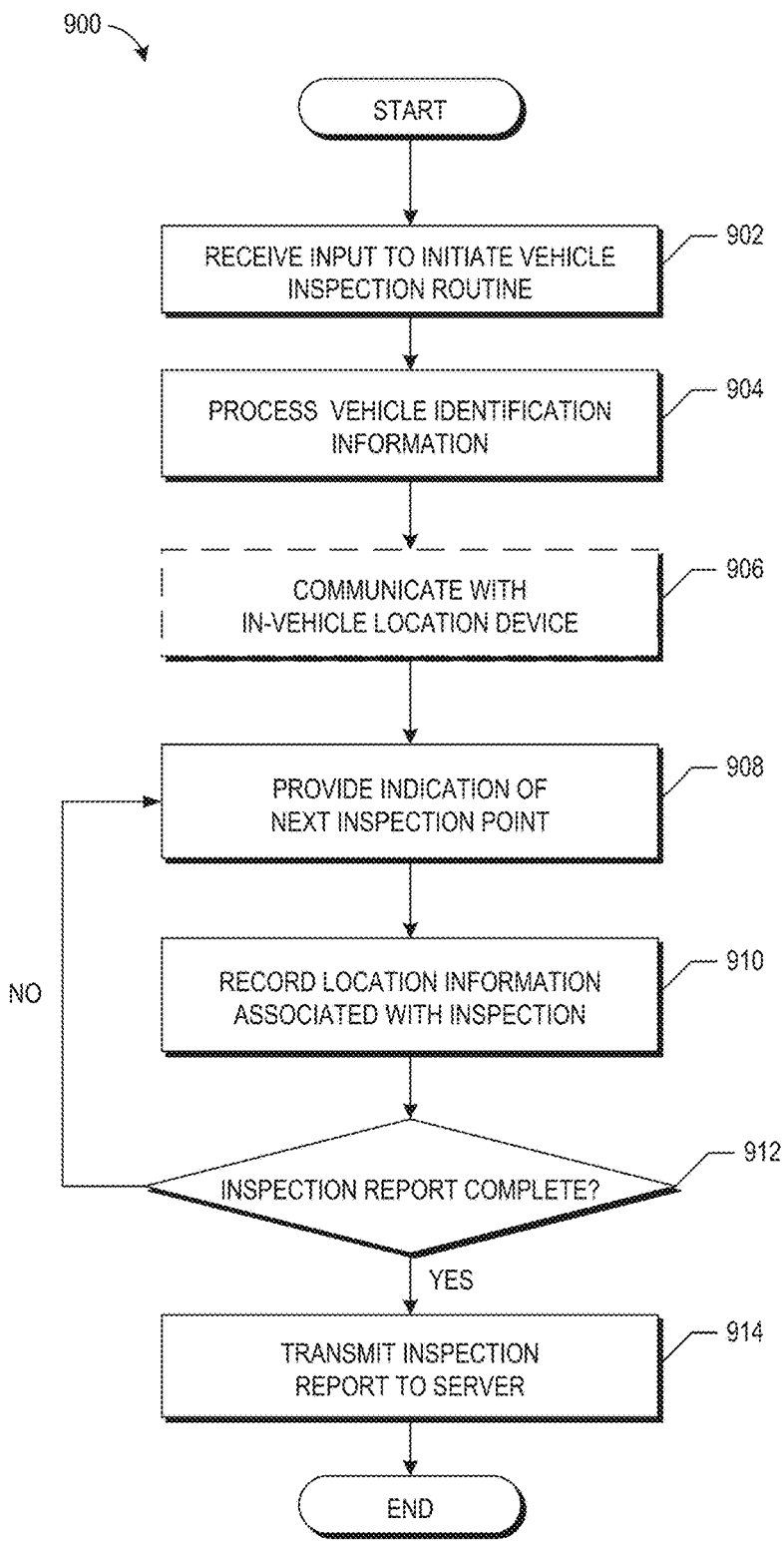
FIG. 9 illustrates an embodiment of a flowchart for a location-based vehicle inspection routine.

FIG. 9 includes a flowchart representing an embodiment of a process for a location-based vehicle inspection routine 900. The process 900 can be implemented by any mobile computing device with a location device that can communicate with the vehicle management system 130.

For example, the process 900, in whole or in part, can be implemented by the operator device 110, the vehicle inspection system 120, the vehicle report module 114, the vehicle management system 130, the report analysis module 132, and/or other devices. Although any number of systems, in whole or in part, can implement the process 900, to simplify the discussion, portions of the process 900 will be described with reference to particular systems and components disclosed herein. The inspection routine 900 starts with initiating the vehicle inspection routine.

At block 902, the operator device receives input to initiate a vehicle inspection routine. An operator may initiate the inspection routine on operator device 110. In some embodiments, the operator device 110 can provide a notification to the operator to initiate the inspection based on the location of the vehicle.

At block 904, the operator device processes vehicle identification information identifying the vehicle. In some embodiments, the operator device 110 can capture an image comprising the vehicle identification information as described in association with blocks 604 and 606 of FIG. 6. The vehicle inspection system 120 can access and/or generate a vehicle inspection report based on the vehicle identification information. In some embodiments, the vehicle inspection report can be retrieved, based on the vehicle identification information, from the report data store 122, the report data repository 144, and/or the fleet data repository 146. In some embodiments, the operator can manually select the vehicle inspection report for the vehicle if the vehicle cannot be automatically identified.

At block 906 the operator device 110 can optionally communicate with the in-vehicle location device (such as a GPS device) or vehicle hub 800 to synchronize location information prior to the inspection routine. In some embodiments, this can be an automated process that is performed by the system after the vehicle inspection routine has been initiated. In some embodiments, the operator device 110 may not communicate with the in-vehicle location device. For example, the operator device 110 may provide the location information to the vehicle management system 130 independent of the location information provided by the in-vehicle location device. In such an embodiment, the vehicle management system 130 can synchronize and process the GPS data after the information is transmitted provided by operator device 110 to the vehicle management system 130.

At block 908, the vehicle inspection report provides an indication that the next inspection point requires inspection. In some embodiments such, as the embodiment illustrated in FIGS. 3A and 3B, a plurality of inspection points may be displayed in a single interface. The vehicle inspection system 120 may include a visual indication such as highlighting or other visual indications that indicate the next inspection point. In some embodiments, only a single inspection point may be displayed at a time. The interface can also include specific instructions identifying the type of inspection that needs to be performed. In some embodiments, the vehicle may have a sticker or other physical indicator identifying location of the inspection point on the vehicle.

At block 910, the operator device can record location information associated with the inspection point. The vehicle inspection system 120 can record the location information and additional information such as time, date, device orientation, and other information, which may be collected by the operator device. In some embodiments, the vehicle management system can automatically verify that the reporting parameters associated with the inspection point have been satisfied based on the location information and/or the additional information.

At block 912, the vehicle inspection system 120 can determine whether the inspection report is complete. If additional inspection points require inspection, the process can return to block 908 where the next indication is provided to the operator for the next inspection point. If no additional inspection points are required, the inspection report can proceed to transmit the report at block 914.

In some embodiments, the vehicle inspection system 120 can determine if the reporting parameters associated with the inspection points have been satisfied. In such an embodiment, if a reporting parameter is not satisfied, the vehicle inspection system may require the operator to redo the identified inspection point. In some embodiments, the reporting parameters are analyzed by the vehicle management system.

At block 914, the vehicle inspection report can be provided to the vehicle management system 130. In some embodiments the report may be stored locally as well as provided to the vehicle management server 130. In some embodiments depending on the bandwidth or communication capabilities of the operator device 110, the report or a summary of the report may be provided without providing a complete copy of all the information associated with the vehicle inspection report. For example, the computing device 110 can store that information locally which can then be synchronized with the vehicle management system 130 when the operator device 110 has the sufficient communication capabilities.

In some embodiments, the vehicle management system 130 may be configured to provide authorization of vehicle reports for pre-inspections of a vehicle prior to operation of the vehicle. The vehicle management system 130 can provide approval contemporaneously or shortly after the vehicle inspections report is completed. During a pre-inspection routine, the vehicle management system 130 can be configured to provide results of the vehicle inspection report during the inspection or after the inspection is complete. For example, the operator device can be configured to stream inspection report data during the inspection. In some embodiments, the operator device can be configured to stream an audio and/or video feed in addition to, or in lieu of, the inspection report information provided by the operator. The vehicle inspection report may need to be approved by the vehicle management system 130 before the vehicle can be operated or the trip can commence. The pre-inspection report may need to be performed in accordance with safety regulations governing operation of a vehicle, such as an airplane. In some embodiments, multiple vehicle inspection reports from different operators can be provided to the vehicle management system at the same time. For example, operators can be inspecting different parts of a vehicle simultaneously. The vehicle inspection reports can be approved by management personnel that can view the inspection report information at a management device, such as management device 104. In some embodiments, the vehicle management system 130 can analyze the vehicle inspection report data and provide an analysis of the vehicle inspection report data (such as an indication of whether the inspection was correctly performed) for the management personnel to review with the vehicle inspection report data. In some embodiments, the vehicle management system can be configured to automatically approve the vehicle inspection reports based on an analysis of the vehicle inspection report data. In some embodiments, the operator can be prevented from operating the vehicle until the inspection report has been approved.

Inspection Point Proximity Detection Routine

Figure 10:
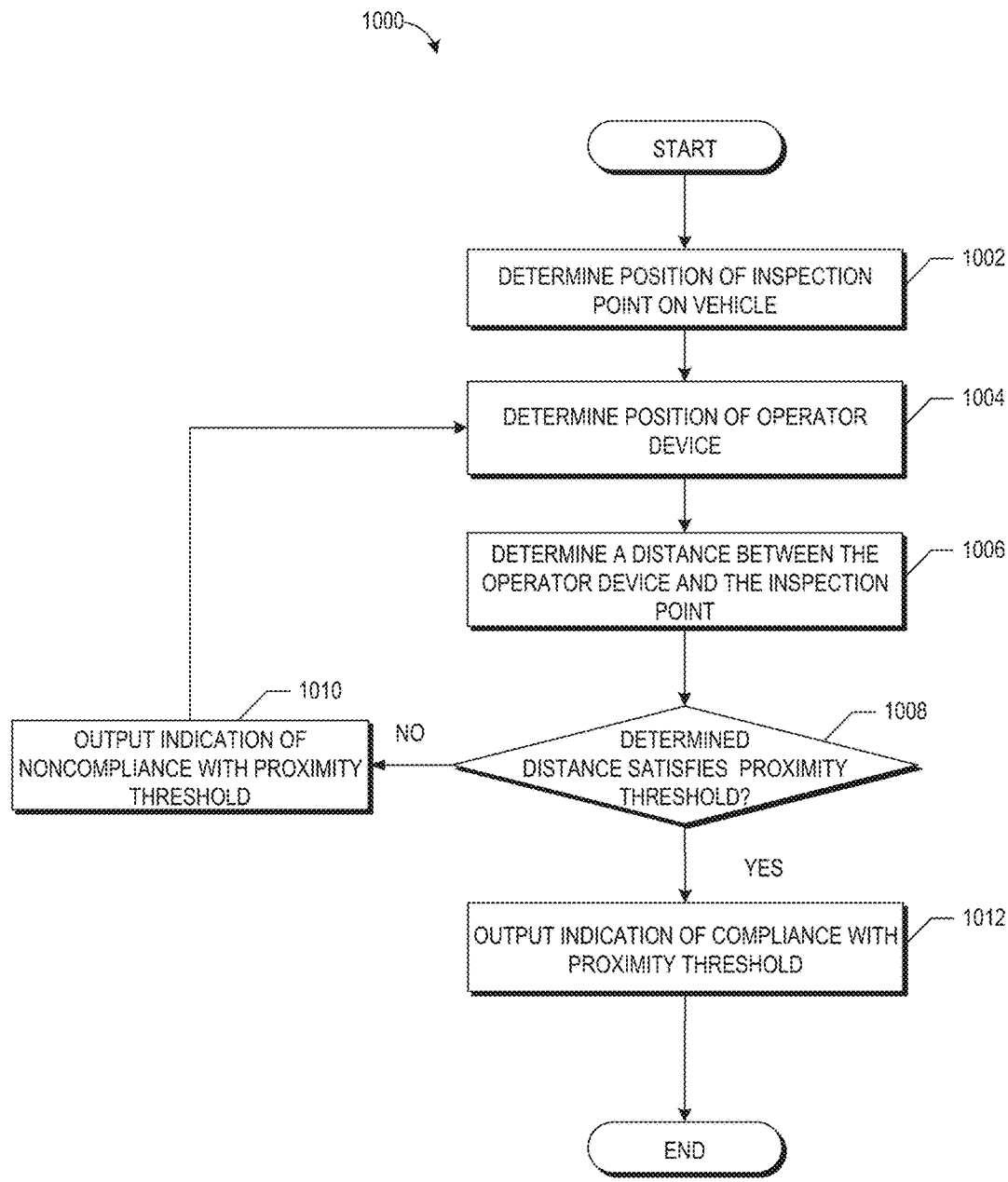
FIG. 10 illustrates embodiments of images of a vehicle.

FIG. 10 includes a flowchart representing an embodiment of a process for an inspection point proximity detection routine 1000. The process 1000 can be implemented in conjunction with a mobile computing device with a location device that can communicate with the vehicle management system 130. In some embodiments, the process 1000 can provide real-time proximity feedback to an operator during an inspection so operators can know when they are within any predetermined proximity requirement that may be associated with a particular inspection location included in an inspection report. In embodiments of the process 1000 utilizing GPS, such real-time proximity detection can be achieved with hardware included in many widely available computing devices and GPS-enabled vehicles.

For example, the process 1000, in whole or in part, can be implemented by the operator device 110, the vehicle inspection system 120, the vehicle report module 114, the vehicle management system 130, the report analysis module 132, and/or other devices. Although any number of systems, in whole or in part, can implement the process 1000, to simplify the discussion, portions of the process 1000 will be described with reference to particular systems and components disclosed herein. The detection routine 1000 can be implemented after identification of an inspection point for inspection by an operator. For example, the detection routine 1000 can be initiated at block 608 of the inspection routine 600 or block 908 of the location-based inspection routine 900.

At block 1002, the vehicle management system 130 can determine the location of an inspection point on a vehicle. The location of the inspection point on the vehicle can be determined based on location information provided by the vehicle to the vehicle management system. The vehicle management system can determine a location and an orientation of the vehicle based, at least in part, on location information provided by at least one location device disposed in the vehicle. In some embodiments, the location information can comprise location information received from a plurality of location devices disposed on the vehicle. For example, the vehicle may have a first location device, such as a GPS device, disposed in the tractor and a second location device disposed in the trailer of the vehicle. In such an embodiment, the vehicle management system can determine orientation of the vehicle based on the location information received from the first location device and the second location device. In some embodiments, the location information provided by the location device can include position information and orientation information, such a facing of the location device.

The vehicle management system can determine the location of the inspection point based on the determined location of the vehicle. In some embodiments, the vehicle management system 130 can generate a virtual representation of the vehicle. The vehicle management system can determine the location of inspection points relative to the virtual representation of the vehicle. For example, the vehicle management system can predefine inspection point locations relative to the locations of the one or more location devices disposed within the vehicle. Thereby, the vehicle management system 130 can identify the location of the inspection points of the vehicle relative to the current location of the vehicle. The vehicle management system 130 can determine the location of the inspection point relative to the location of the vehicle in real-time.

At block 1004, the vehicle management system 130 can determine the position of the operator device based on location information received from the operator device. In some embodiments, the operator device includes a location device that can provide location information to the vehicle management system 130. In some embodiments, the operator device can communicate with a location device on the vehicle in order to synchronize location information prior to communicating with the vehicle management system. For example, the location device in the vehicle and the location device in the operator device can be instructed to use the same one or same plurality of GPS satellites for determining the locations of each. As such, any errors in the determination of the location of the vehicle-mounted device and the operator device would apply to both location determinations. Other techniques can also be used.

At block 1006, the vehicle management system can determine a distance between the operator device and the inspection point. The vehicle management system can use the determined position of the inspection point on the vehicle device and the determined position of the operator device to determine a relative distance between the operator device and the inspection device. The determination of the distance between the operator device and the inspection point can be updated in real-time during the inspection routine. For example, in some embodiments, the determined distance can be updated each time location information received from operator device updates the location of the operator device. In some embodiments, the location information received from the vehicle and the operator device may need to be triangulated, modified, and/or processed in order to determine the location of the operator relative to the vehicle. For example, the location information may need to be processed to account for a locational offset associated with the location information. Further, in embodiments where the vehicle-mounted location devices and the operator device are synchronized to use the same one or collection of satellites for location determinations, any error in absolute location determinations would substantially adversely affect the determination of the relative distance between the respective location determinations.

At block 1008, the vehicle management system determines whether the determined distance between the operator device and the inspection point satisfies a proximity threshold associated with the inspection point. In some embodiments, the proximity threshold can be based on a specific proximity requirement associated with the inspection point. A proximity requirement can require that the operator device is within a defined distance of the inspection point in order to complete the inspection. In some embodiments, the distance threshold can be based on a default proximity requirement that can be used when a more specific proximity requirement is not associated with the specific inspection point. If the determined distance satisfies the proximity threshold, the routine can proceed to block 1012. If the determined distance does not satisfy the proximity threshold, the routine can proceed to block 1010.

At block 1010, the vehicle management system can output an indication of noncompliance with the proximity threshold. The vehicle management system can provide instructions to the operator device to output an indication that the operator device is not within the defined proximity threshold. In some embodiments, the output can be configured to include a current distance from the operator device to the inspection point, the proximity threshold, and/or an approximate direction from the location of the operator device to the inspection point. The process can proceed to block 1004 and continue updating the location of the operator device until it satisfies the proximity threshold.

At block 1012, the vehicle management system 130 can output an indication of compliance with the proximity threshold. The vehicle management system 130 can provide instructions to the operator device to output an indication that the operator device is within the defined proximity threshold. In some embodiments, the output can be configured to include additional instructions for inspection of the inspection point after the proximity threshold has been satisfied. In some embodiments, after the proximity threshold has been satisfied, the vehicle management system can automatically update the vehicle inspection report to indicate that the inspection point has been inspected. The process can be repeated at each inspection point within an inspection report.

Example Embodiment

Figure 11A:
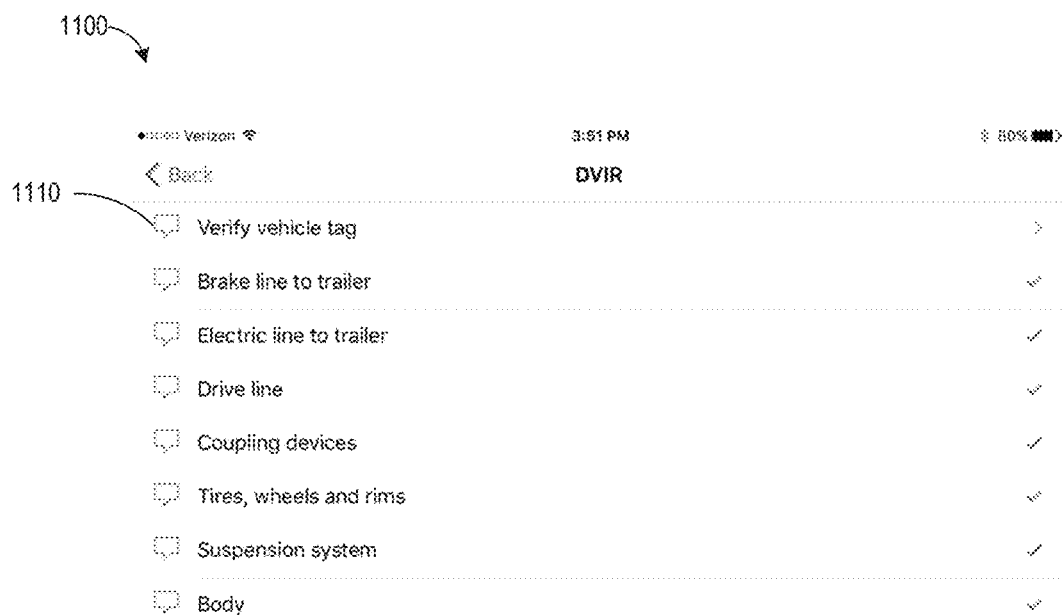
FIGS. 11A-11C illustrate an example embodiment of an interface for an operator device for a vehicle inspection report.
Figure 11B:
Figure 11C:
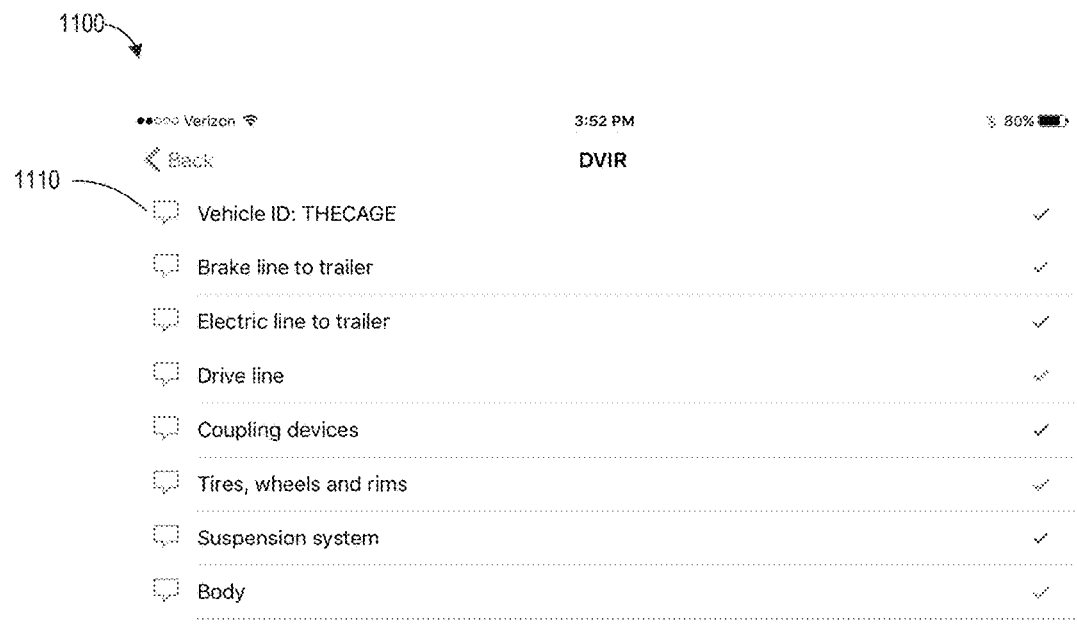

FIGS. 11A-11C illustrate an example embodiment of an interface for an operator device for a vehicle inspection report. In the illustrated embodiment, the vehicle inspection report application can be configured to automatically identify the vehicle based on a vehicle identifier (such as, for example, a license plate). FIG. 11A illustrates the interface 1100 for an operator to identify a vehicle that will be inspected. For example, the interface 1100 can have an interface element 1110 that can be configured to interface with a capture device in order to capture image data associated with a vehicle. FIG. 11B illustrates an embodiment of a capture interface 1120 for capturing image data associated with a vehicle. FIG. 11C illustrates the interface 1100 after the image data associated with the vehicle has been processed and the vehicle identifier on the license plate of the vehicle in FIG. 11B has been automatically identified.

Motion Tracking Using Mobile Device Sensors for Vehicle Inspection Reports

FIGS. 12-15 are directed towards embodiments of a vehicle inspection report system that is configured to use movement detection data to determine whether an operator conducted a vehicle inspection walk around when completing a vehicle inspection report. For example, one or more sensors disposed within a mobile computing device can be used to detect movement during an inspection. The output of the sensors can be considered as indicative of whether a user has moved in a way consistent with movement required to correctly perform an inspection.

Figure 12:
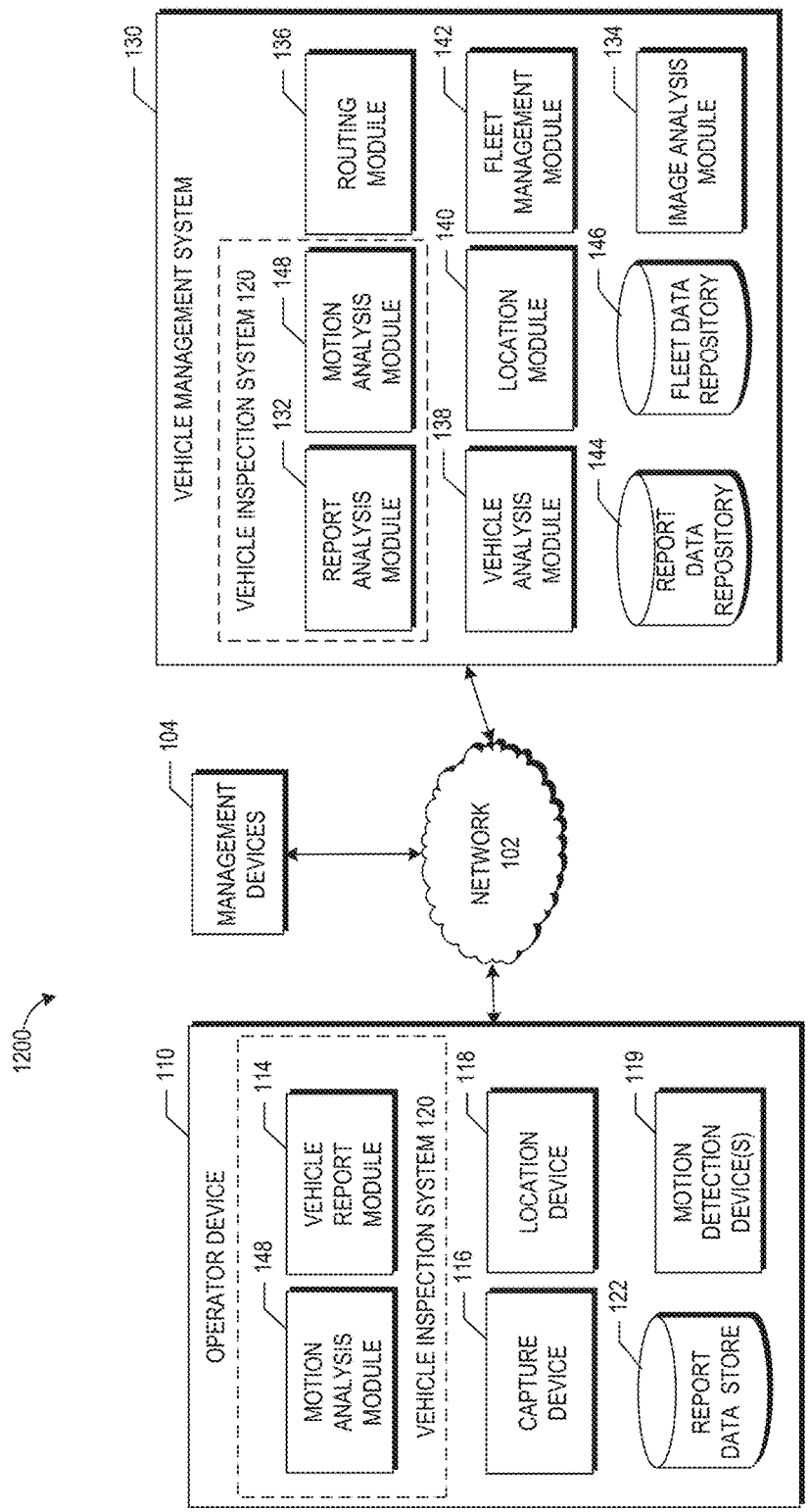
FIG. 12 illustrates an embodiment of a computing environment for a vehicle management system.

FIG. 12 illustrates an embodiment of a computing environment 1200 which can be used for implementing a vehicle management system 130. Among other features, the vehicle management system 130 can provide an automated system for supporting a vehicle inspection, optionally including analyzing various aspects of vehicle inspection reports. The computing environment 1200 can be similar to the computing environment 100 discussed with reference to FIGS. 1A and 1B. In this embodiment of the computing environment, the operator device 110 may additionally include 119 one or more motion detection devices. Additionally, the operator device 1210 and the vehicle management system 130 may include a motion analysis system 148. The one or more motion detection devices 119 may be incorporated into the operator device 110. Additionally, the functionality of the motion analysis module 148 may be incorporated in the operator device 110 and/or the vehicle management system 130. The other elements of the operator device 110 and vehicle management system 130 function as discussed above.

The motion detection devices 119 can be configured to generate movement data indicative of movement of the operator device 1210. The motion detection devices 119 can include sensors that gather and output data associated with the motion of the mobile computing device, such as, for example, an accelerometer, a magnetometer, a gyroscope, and/or other sensors. The sensors are configured to detection movement and output an indication of movement. The indication of movement can be output from the sensor in various forms, which can be dependent on the specific sensor being used. Some examples of sensor outputs can include analog outputs (e.g., varying voltage levels that fluctuate between a ground voltage and a supply voltage level), digital outputs (e.g., discrete output values), wave forms (e.g., pulse-width modulation (PWM) output square waves with a known period, but a varying duty cycle), and the like. The data corresponding to the indication of movement can be stored for further processing. The output data from the sensors may be processed using one or more hardware- and/or software-based filters prior to storage. For example, the signals may be filtered to remove or reduce signal noise. The motion analysis module can perform additional post-processing on the movement data.

The motion analysis module 148 can be configured to process and analyze the movement data associated with the motion detection devices 119. The motion analysis module 148 can track and analyze the movement data over time in order to help determine whether an operator physically walked around an inspection path during the time period in which the operator should be inspecting the vehicle. The motion analysis module 148 can be configured to record time-based information associated with the vehicle inspection report. For example, the motion analysis module 148 can record the total time of the vehicle inspection, time between user interactions with the computing device, and other time-based information associated with the vehicle inspection. The movement data can include acceleration data and orientation data that can be used to analyze various aspects of the vehicle inspection. The system can analyze the collected data (e.g., acceleration data, orientation data, time-based data, etc.) in order to determine patterns in the vehicle inspections. For example, the motion analysis module can be configured to recognize acceleration data patterns and/or orientation data patterns that are associated with specific inspection points (e.g., bending over to inspect the undercarriage of a vehicle). Over time the motion analysis module can determine acceptable patterns and gradually improve and modify the vehicle inspection detection algorithms to make a more reliable determination of whether a vehicle inspection walk around is being conducted by an operator.

The motion analysis module can determine whether the collected data matches one or more defined patterns associated with inspection points. For example, an inspection point may be associated with one or more inspection point patterns. An inspection point pattern may include acceleration data and/or orientation data that is associated with the type of inspection performed by a user at a specific inspection point. For example, the movement of the mobile computing device when a user bends down to inspect the undercarriage of a vehicle or a wheel may be associated with specific patterns of acceleration data and/or orientation data. The motion analysis module can determine whether the inspection of the vehicle satisfied the one or more inspection point patterns that are associated with a vehicle inspection.

The motion analysis module may record the time that an inspection event occurred based on a determination that an inspection point pattern has been completed. The determination that the inspection pattern has been completed may be compared and/or correlated with the other inspection event information, such as a user input indicating that the inspection point has been completed.

The motion analysis module 148 can be configured to determine a confidence rating associated with the vehicle inspection report. The confidence rating can indicate the probability that the vehicle inspection was properly completed by the operator. In some embodiments, the probability rating can be based on individual ratings associated with classes of data (e.g., acceleration data, orientation data, time-based data, etc.) with an aggregate score being determined based, at least in part, on the individual scores. In some embodiments, the confidence rating can be independent of location sensor data (e.g., a GPS sensor) or image-based data associated with the inspection. One benefit of using the motion sensor data is that it can be used regardless of whether the computing device has network connectivity. The motion data can be accurate and reliable regardless of location on most modern mobile devices.

Figure 13A:
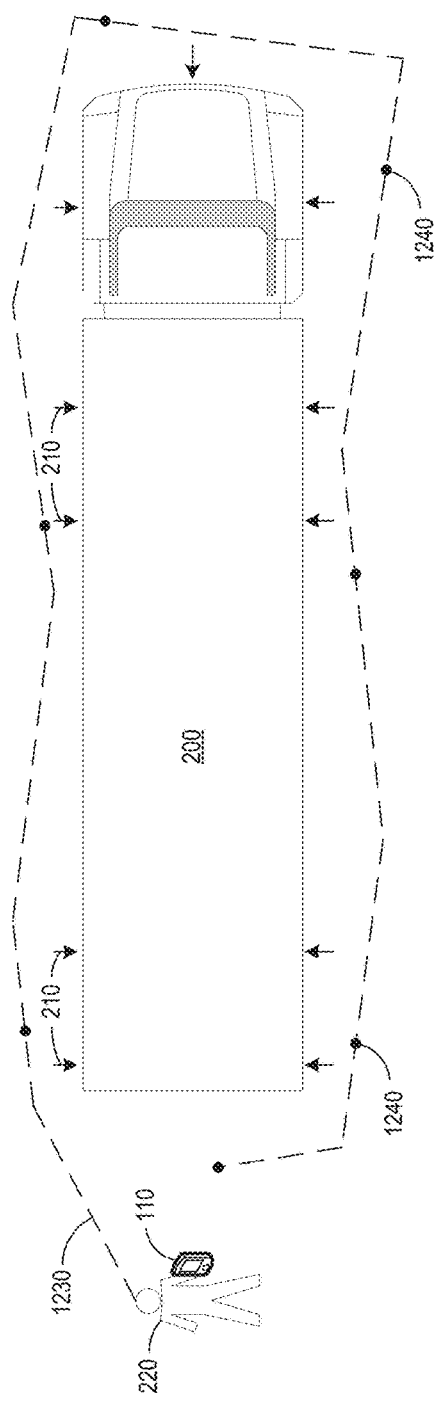
FIG. 13A illustrates an embodiment of vehicle comprising a plurality of inspection locations and an inspection path of an operator performing a vehicle inspection.

FIG. 13A illustrates an inspection path 1330 taken by an operator 220 equipped with an operator device 110. The operator inspection path 1330 illustrates a path an operator could take to inspect the vehicle 200. The vehicle 200 has a plurality of inspection points 210. At various points along the inspection path 1330, the operator can provide input for various inspection events 1340. For example, the inspection events 1340 may require the operator to provide input to the computing device 110 indicating that one or more inspection points 210 have been inspected. As illustrated, a plurality of inspection events 1340 can occur during the inspection of the vehicle by the operator.

Figure 13B:
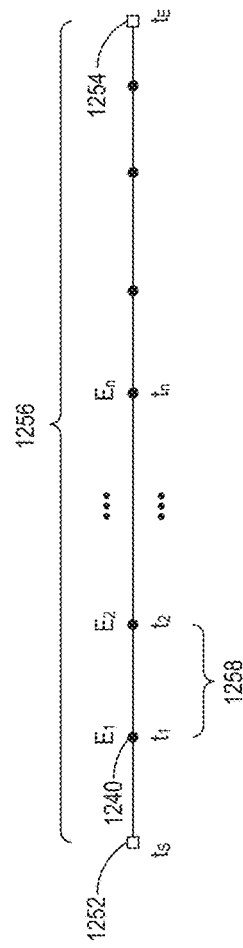
FIG. 13B illustrates an embodiment of an inspection timeline.

With additional reference to FIG. 13B, an embodiment of an inspection timeline 1350 is illustrated. The inspection timeline 1350 includes an inspection start event 1352 and inspection end event 1354. The start event corresponds to when the operator initiated the vehicle inspection on the operator device 110, which may include corresponding start time information ($t_S$). The end event 1354 corresponds to when the operator ended the vehicle inspection on the operator device 110, which may include corresponding end time information ($t_E$). The total inspection time 1356 indicates the amount of time that passes between the start time ($t_S$) and the end time ($t_E$). During the inspection, the operator can be required to provide input in order to complete for the inspection report. Each input provided by the operator can be recorded as an inspection event 1340 (e.g., $E_1$, $E_2$, through $E_n$) by the operator device. The operator device 110 can record time information associated with each inspection event (e.g., $t_1$, $t_2$, through $t_n$). The time information includes a time stamp that records when the operator completed the inspection event 1340.

The time information can include inspection point intervals 1358 that provide the time between inspection events. For example, the interval time for the illustrated inspection point interval 1358 is the amount of time that passed from the timestamp $t_1$ associated with $E_1$ until the timestamp $t_2$ associated with $E_2$. The relative time information at each interval can be used to group and analyze data received from the computing device during the vehicle inspection. The vehicle inspection system can analyze the time information and movement sensor data to determine whether the inspection path 230 would have encompassed the entire vehicle as will be discussed in more detail below.

Movement Sensor-Based Vehicle Inspection Routine

Figure 14:
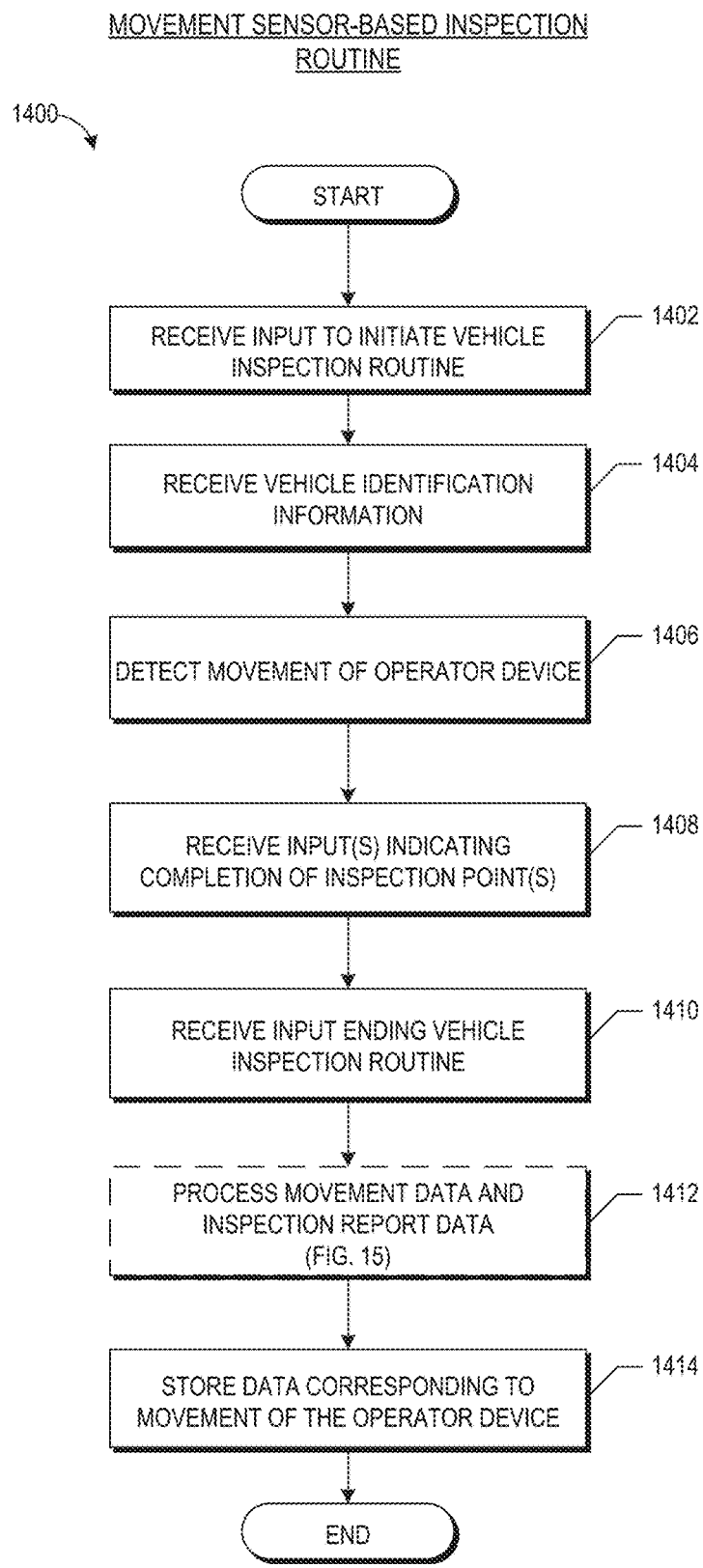
FIG. 14 illustrates an embodiment of a flowchart for a movement-based vehicle inspection routine.

FIG. 14 illustrates a flowchart representing an embodiment of a routine for a vehicle inspection routine 1400. The routine 1400 can be implemented by any mobile computing device that includes one or more motion detection sensors 119, such as, for example, an accelerometer, a magnetometer, a gyroscope, or other motion detection sensors that can be configured to gather and record data associated with the motion of the mobile computing device. The routine 1400, in whole or in part, can be implemented by the operator device 110, the vehicle inspection system 120, the vehicle report module 114, the vehicle management system 130, or the report analysis module 132, the motion detection device 119, the motion analysis module 148, or other modules systems and devices. Although any number of systems, in whole or in part, can implement the process 1400, to simplify the discussion, portions of the process 1400 will be described with reference to particular systems.

At block 1402, input is received to initiate a vehicle inspection. For example, the operator device 110 can receive an input to initiate a vehicle inspection routine. An operator may initiate the inspection routine on operator device 110. The operator device can record a timestamp associated with the initiation of the vehicle inspection routine.

At block 1404, vehicle identification information is received. The vehicle identification information can be entered manually by an operator, image data comprising vehicle identification information, and/or automatically provided by the vehicle inspection system 120. In some embodiments, the image data can be used for automatic identification of the vehicle. The vehicle identification information may be used to generate a vehicle inspection report that is specific to the vehicle. In some embodiments, vehicle inspection report can be retrieved, based on the vehicle identification information, from the report data store 122, the report data repository 144, and/or the fleet data repository 146. In some embodiments, the vehicle identification information can be used to partially identify a vehicle. For example, the vehicle identification information can be used to generate a subset of vehicles that match the information (for example, white tractors) and then a user can select the appropriate vehicle from a list. In some embodiments, the operator can manually select the vehicle inspection report for the vehicle if the vehicle cannot be automatically identified. Identification of a vehicle associated with a specific vehicle or class of vehicles can help reduce and/or eliminate the usage of vehicle inspection reports that include inspection points that are unrelated to the inspection of the operator's vehicle. In some embodiments, the vehicle inspection report can be automatically populated, such as the vehicle inspection report illustrated in FIG. 5B. The vehicle inspection report can have one or more input elements or form fields that are associated with one or more inspection points, which the operator can complete during the inspection report.

At block 1406, one or more motion detection sensors can detect movement data associated with movement of the operator device 110. The movement data can include movement data received from one or more movement detection sensors 119 of the operator device 110. For example, the movement detection sensors may include an accelerometer, a magnetometer, a gyroscope, or other motion detection sensor(s). The sensors are configured to detection movement and output an indication of movement. The indication of movement can be output from the sensor in various forms, which can be dependent on the specific sensor being used. Some examples of sensor outputs can include analog outputs (e.g., varying voltage levels that fluctuate between a ground voltage and a supply voltage level), digital outputs (e.g., discrete output values), wave forms (e.g., pulse-width modulation (PWM) output square waves with a known period, but a varying duty cycle), and the like. The data corresponding to the indication of movement can be stored for further processing.

At block 1408, the vehicle inspection system 120 receives an input indicating that the inspection of the inspection point is complete. In some embodiments, a plurality of inspection points may be displayed in a single interface. In some embodiments, only a single inspection point may be displayed at a time. The vehicle inspection system 120 can include a visual indication such as highlighting or other visual indications that indicate the next inspection point. The interface can also include instructions identifying the type of inspection that needs to be performed at a specific inspection point. In some embodiments, the vehicle can have a sticker or other physical indicator identifying location of the inspection point on the vehicle. The input can be received from the operator indicating the inspection has been completed for each inspection point. The system can record a timestamp each time an input indicating completion of an inspection point is received. The time stamp can be relative to the start time of the vehicle inspection, relative to the completion of the previous inspection event, and/or be an absolute time based on the time of day. The system can be configured to determine inspection intervals between inputs on the report. In other words, the system can determine the amount of time it took the operator to complete each inspection point. At block 1410, the vehicle inspection system 120 can receive the an input indicating the end of the vehicle inspection.

At block 1412, the movement data and/or inspection report data can, optionally, be processed by the vehicle inspection system on the operating device 110. In some embodiments, processing of the movement data can be performed by the vehicle management system 130. The output data from the sensors may be post-processed using one or more hardware- and/or software-based filters. For example, a filter can be configured to filter out movement data that is outside a defined frequency range. In some embodiments, the data can be filtered based on defined movement types and/or movement event for a specific sensor. For example, an accelerometer may be used to detect whether the operator 220 is walking with the operator device 110. Movement data that is outside the frequency range generally associated with walking can be negatively weighted. In some embodiments, one or more filtering thresholds can be used, where only data that satisfies a defined frequency threshold will be further analyzed. Additional details associated with the processing of the movement data and the inspection report data are discussed with reference to FIG. 14.

At block 1414, the operator device 110 can be configured to store at least a portion of the data corresponding to the movement of the operator device with the vehicle inspection report. The vehicle inspection system may be configured to associate the movement data with the vehicle inspection report. In some embodiments, the movement data is stored with the vehicle inspection report, such as in the same file. The data corresponding to the movement of the operator device may be only a portion of the movement data collected during the vehicle inspection. In some embodiments, where the vehicle inspection report processing is performed by the operating device, the output of the processing results may be stored with or without the movement data.

The vehicle inspection report can be provided to the vehicle management system 130. In some embodiments the report can be stored locally as well as provided to the vehicle management server 130. In some embodiments depending on the bandwidth or communication capabilities of the operator device 110, the report or a summary of the report can be provided without providing a complete copy of all the information associated with the vehicle inspection report. For example, the computing device 110 can be configured to store that information locally which can then be synchronized with the vehicle management system 130 when the operator device 110 has the sufficient communication capabilities.

Movement Sensor-Based Processing Routine

Figure 15:
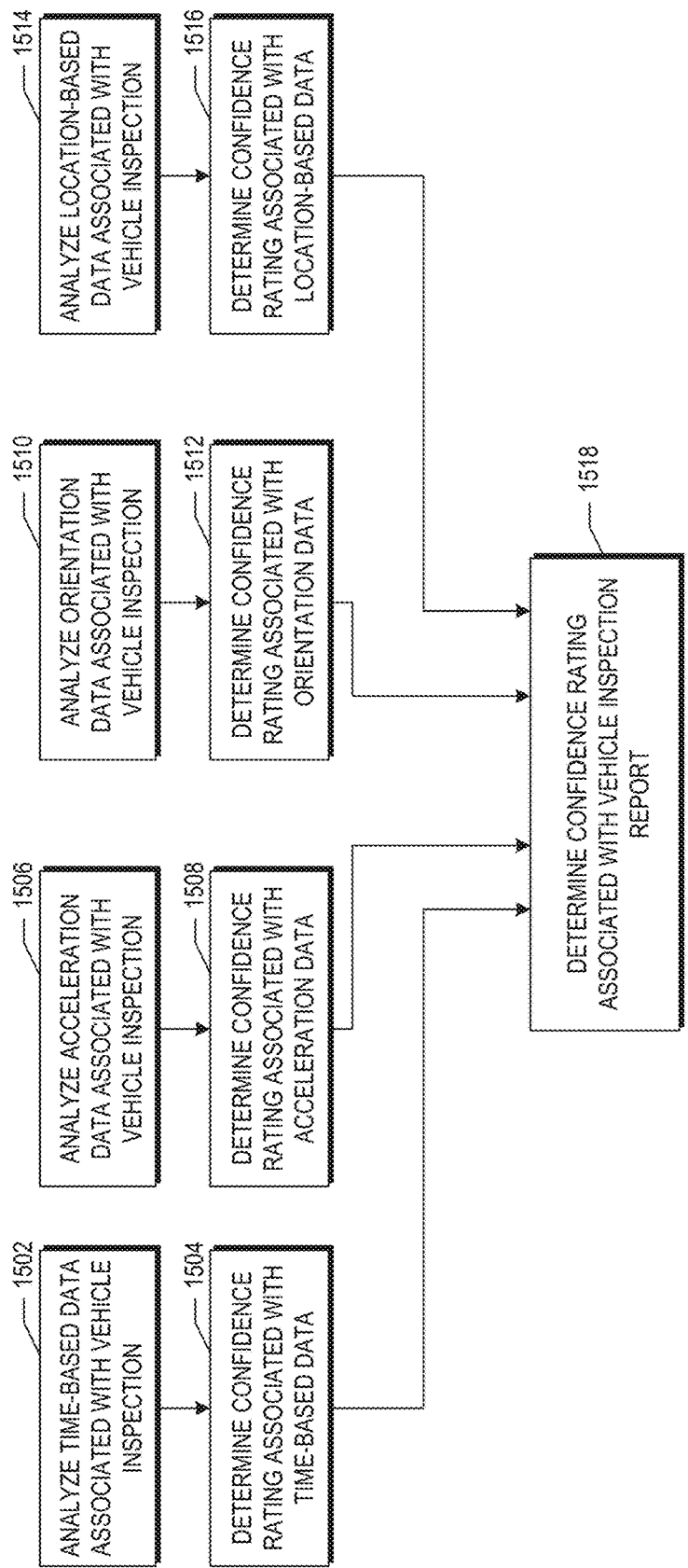
FIG. 15 illustrates an embodiment of a flowchart for a routine for processing vehicle inspection data.

FIG. 15 illustrates a flowchart representing an embodiment of a routine for processing vehicle inspection data 1500. The routine 1500 can be implemented by any mobile computing device that includes one or more motion detection sensors, such as, for example, an accelerometer, a magnetometer, a gyroscope, or other motion detection sensors that can be configured to gather and record data associated with the motion of the mobile computing device. The routine 1500, in whole or in part, can be implemented by the operator device 110, the vehicle inspection system 120, the vehicle report module 114, the vehicle management system 130, or the report analysis module 132, the motion detection device 119, the motion analysis module 148, or other modules systems and devices. Although any number of systems, in whole or in part, can implement the process 1500, to simplify the discussion, portions of the process 1500 will be described with reference to the vehicle inspection system 120. Depending on the embodiment the operator device and/or the vehicle management system can process the vehicle inspection data.

At block 1502, the vehicle inspection system can analyze time-based data associated with the vehicle inspection. The time-based information can be used to determine the total amount of time spent on the vehicle inspection report. The vehicle inspection system can use the time-based information to determine the time intervals between inspection events. The vehicle inspection system can establish one or more time-based thresholds. The time-based thresholds can be associated with the total inspection time and/or the inspection event intervals. For example, the total time threshold can be the minimum amount of time that the entire vehicle inspection is expected to take from the beginning to the end. The interval time events thresholds can be specific to the inspection points that are being inspected by the operator. For example, the undercarriage inspection may require more time than the inspection of the wheels and tires. A different threshold can be applied to each inspection interval. In some embodiments, the inspection interval is a set value that is the same for each interval (e.g., 15 seconds per interval). This can be helpful in determining whether the operator is inputting all the events at the same time, but may be waiting a set amount of time to finalize and submit the vehicle inspection report. The thresholds can be set individually and can be modified by an administrator and/or the vehicle inspection system.

At block 1504, the vehicle inspection system can determine a confidence rating associated with the time-based data. The system can evaluate the inspection time information associated with the inspection report to determine a probability that the operator completed the walk around associated with the vehicle inspection. The time-based probability rating can be a single value that is based on an analysis of the individual time-based values. For example, the probability can be a mean probability associated with aggregate scores associated with each time interval and the total time value.

At block 1506, the vehicle inspection system can analyze acceleration data associated with the vehicle inspection. The acceleration data can be determined, based at least in part, on data received from an accelerometer. The vehicle inspection system can analyze the acceleration sensor data to determine a state of movement of the operator device. For example, the state of movement can correspond to walking, running, sitting, standing, and the like. In some embodiments, the variability of the acceleration data can be used to help determine the state of movement. For example, when the computing device 110 is not moving, the variability of the accelerometer data can be close to zero. When a user is holding device, the variability can be generally low, and higher when the user is walking or running.

The vehicle inspection system can be configured to filter and process and score the movement data to focus on data associated with the correct type of movement, such as walking. The system can be configured to filter out or lower scores associated with that is associated with states of movement that are not indicative of an operator performing a vehicle inspection. For example, the system can be configured to determine whether an operator is shaking the operator device, rather than walking. The vehicle inspection system can be configured to determine whether the operator is trying to fake the movements that would be associated with an inspection. For example, the vehicle inspection system can be configured to filter out movements associated with merely rotating the computing device in place (e.g., rotating from portrait view to landscape view) without moving around the vehicle. To help the system determine whether the movement is real, the system can be configured to filter the acceleration data based on typical walking and running frequencies. The vehicle inspection system can define a frequency range, which can be used as a filter for analyzing the acceleration data. For example, in some embodiments, movements outside the range of 1.5 Hz to 2.5 Hz can be filtered. In some embodiments, the system can used the frequency range as a threshold or filter in order to determine the amount of time that an operator device is operating within the defined frequency range. For example, the vehicle inspection system may determine that the operator device operated within the defined range for 3 minutes of the total inspection time. In some embodiments, the system can applied weighted values to the sensor data based on the frequency of the data. For example, as the frequency moves outside the range, negative weights can be applied to the sensor data. For example, for frequencies greater than 2.5 Hz and data can be assigned a negative weight.

At block 1508, the vehicle inspection system can determine a confidence rating associated with the acceleration data. The system can analyze the acceleration data to determine confidence ratings associated with the movement of the device to determine whether the operator is engaged in the anticipated type of movement during the inspection. The confidence rating can be reflective of a probability that the operator performed the inspection. The system can be configured to perform an analysis of the entire inspection between the start time and the end time. In some embodiments, the system can be configured to analyze the data at each inspection time interval to determine a probability that enough movement was performed between inspection events. In some embodiments, the determined type (e.g., walking, running, sitting, etc.) and quantity (e.g., amount of time spent performing the movement) of the operator device can be compared to a base or expected type and quantity of movement that would be expected to perform the inspection. In some embodiment, a minimum total amount of time can be configured, and can be adjusted to the expected amount of time an operator spends performing various movement actions (e.g., walking) during a vehicle inspection. The acceleration-based probability rating can be a single value that is based on an analysis of the aggregate scores associated with the acceleration data.

At block 1510, the vehicle inspection system can analyze orientation data associated with the vehicle inspection. The orientation data can be used to determine the attitude with respect to gravity, and also the heading of the computing device. The orientation data can be determined based at least in part on data received from an accelerometer, a magnetometer, and/or a gyroscope. The vehicle inspection system can determine the how often the orientation of the device changes and how the direction of the orientation change. The variability of the orientation change can help to provide an indication of movement by the operator device. When an operator is sitting, standing, or walking in a straight line, a device can have a relatively low orientation variability. If the operator is walking a square around a truck, or regularly changing the angle of the device, this can result in higher orientation variability.

The orientation data can be analyzed to determine changes in direction of the operator. In a general inspection, the operator would be expected to change direction multiple times during the inspection. The system can be configured to filter out frequencies associated with quick changes is directions, that may be related to small changes in direction of the computing device, such as shaking the device. In some embodiments, the system can be configured to filter out changes that are above 0.5 Hz. Filtering out changes in direction at frequencies above 0.5 Hz, can help the system determine whether the operator is maintaining an orientation for a longer period of time (e.g., about 2 seconds). This can be a configurable threshold that can be optimized to determine when the operator is moving and changing direction appropriately. In some embodiments, the orientation information can be used to construct a directional mapping associated with the movement of the operator and the computing device. For example, the vehicle inspection system may be able to determine a relative mapping of the changes in direction of the operator device. In some embodiments, the vehicle inspection system can be configured to define orientation data that is expected to be received during specific inspection routines, such as bending down to inspect the undercarriage of a vehicle.

At block 1512, the vehicle inspection system can determine a confidence rating associated with the orientation data. The system can analyze the orientation data to determine confidence ratings associated with the movement of the device to determine whether the operator is engaged in the anticipated type of movement during the inspection. The confidence rating can be reflective of a probability that the operator performed the inspection. The system can be configured to perform an analysis of the entire inspection between the start time and the end time. In some embodiments, the system can be configured to analyze the data at each inspection time interval to determine a probability that the expected changes in orientation occurred in order to inspect the vehicle. In some embodiments, the determined types of changes in orientation and number of changes in orientation of the operator device can be compared to a base or expected values associated with the changes. In some embodiment, a minimum number of changes in orientation can be used to determine whether the proper actions were performed during a vehicle inspection. For example, the vehicle inspection system can identify an orientation movement template that can be associated with defined inspection actions. The generated orientation data can be compared to the template to determine one or more confidence ratings associated with the data. The orientation-based probability rating can be a single value that is based on an analysis of the aggregate scores associated with the orientation data.

At block 1514, the vehicle inspection system can analyze location-based data associated with the vehicle inspection. The location-based information can be used to determine the total distance travelled and locations that the operator moved during the vehicle inspection report. The vehicle inspection system can use the location-based information to determine the scope and shape of the operator's movements during the vehicle inspection report. The location-based data can be used to construct an path, such as illustrated in FIG. 7A. The path can be used to estimate the locations that the operator traveled during the inspection. For example, the location-based data can be used to determine an approximate length and width of the path travelled by the operator.

At block 1516, the vehicle inspection system can determine a confidence rating associated with the location-based data. The system can evaluate the location data to determine a probability that the operator completed the walk around associated with the vehicle inspection. For example, the system can compare the path of the walk around to the vehicle information, such as the length width and height of the vehicle. The system can determine whether the operator's path would have allowed the operator to inspect all of the locations on the vehicle. For example, if the location-based data indicates that the operator device traveled in a straight line or in a small two foot by two foot area, the system can determine that it is unlikely that the operator walked around a tractor trailer that is 30 feet long and 12 feet wide. In some embodiments, the system can include templates for location-based path data that can be compared to the location-based data to determine whether the operator completed the inspection path. The location-based probability rating can be a single value that is based on an analysis of the individual location-based analyses. For example, the probability can be a mean probability associated with aggregate scores associated with various analyses conducted on the location-based data.

At block 1518, the vehicle inspection system can determine a confidence rating associated with the vehicle inspection report. The system can be configured to determine a probability value associated with the vehicle inspection report based, at least in part, on a time-based probability rating, a location-based probability, an acceleration-based probability, and/or an orientation based probability. As discussed, each algorithmic analysis of the various data sets can be configured to output a confidence rating. In some embodiments, these values can be combined into a single rating which represents the overall estimated probability that the operator performed the proper inspection of the vehicle when completing the vehicle inspection report. In one embodiment, the system can compute a geometric mean of the probabilities. The geometric mean can be preferable over the arithmetic mean (the average) as it can result in a single low probability result for one of the analyses to pull the entire result down. Thus, a single low probability value would not be entirely offset by a high probability value in another category. For example, if the movement probability indicates that the operator was not moving during the inspection, but both the data from the orientation analysis and time-based analysis reported a high probability, the total probability could still be low. In some embodiments, the results can be analyzed individually, with each result having an individual threshold indicating whether the data indicates that a vehicle inspection report has been completed.

In some embodiments, the vehicle inspection system may be configured to use a subset of specific parameters to determine the confidence rating of the vehicle inspection report, such as one or more of the parameters. For example, a vehicle inspection system may be configured to analyze time-based data or position-based data or a combination of the different data sets, to determine the probability rating. In some embodiments, the vehicle inspection system can be configured to only collect and analyze a subset of the one or more of data sets. For example, a vehicle inspection system may be configured to collect time-based data or position-based data or a combination of the different data sets.

In some embodiments, the probability metrics can be combined with the images or location information in order to help determine whether the operator physically walked around the vehicle during an inspection. For example, the image capture vehicle inspection report and location-based inspection report processes described herein can be combined with the motion tracking processes.

Terminology

As used herein, the term "road" in addition to having its ordinary meaning, can include, among other things, a street, a highway, a freeway, a toll road, a turnpike, an arterial road, a frontage road, an on-ramp, an off-ramp, a city street, a surface street, a residential street, a dirt road, a parking lot, a driveway, an intersection, a traffic circle, a roundabout, a rotary, an alley, any path upon which a vehicle can travel, combinations of the same, or the like. Further, although this specification refers primarily to streets for automobiles, trucks, and the like, the techniques described herein can also be applied to paths traveled by other vehicles, such as railroads, flight paths, and waterways. Moreover, the techniques described herein may also be applied for mixed mode routing. In other words, the embodiments disclosed herein may be used to determine access paths routes that include the use of multiple types of vehicles. For example, a route may be determined for a driver of the truck that also includes using a ferry. As another example, a route may combine the use of a car, a boat, and a train. In some cases, the mixed mode routing may also include a segment of walking, use of a bicycle, or public transportation, such as a subway or underground railroad network.

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 150 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The following list has example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure:

1. A method of remote verification of a vehicle inspection comprising a plurality of inspections of a plurality of vehicle inspection locations, respectively, the method comprising:
   by a mobile computing device comprising computer hardware:
   capturing a first identification image of at least a portion of a vehicle, the portion of the vehicle comprising a vehicle identification indicia, and wherein the captured first identification image comprises an image of the vehicle identification indicia;
   obtaining vehicle identification information identifying a vehicle based, at least in part, on an analysis of the first identification image;
   providing an interface associated with a vehicle inspection report for the identified vehicle, the vehicle inspection report comprising at least one data field associated with a first inspection of a first inspection location on the vehicle;
   capturing at least a first inspection image of the first inspection location on the vehicle;
   adding the first inspection image to the vehicle inspection report and in association with first inspection data of the first inspection;
   receiving an input indicating completion of the first inspection of the first inspection location on the vehicle; and
   providing at least a portion of the first inspection data associated with the completion of the first inspection to a vehicle management system.

2. The method of embodiment 1, wherein the analysis of the first image is performed by the mobile computing device.

3. The method of embodiment 1 further comprising transmitting the first identification image to the vehicle management server, wherein the analysis of the first identification image is performed by the vehicle management system.

4. The method of embodiment 1, wherein the vehicle identification indicia comprises a license plate.

5. The method of embodiment 1 further comprising obtaining a vehicle inspection report associated with the identified vehicle.

6. The method of embodiment 1 further comprising obtaining location information associated with the one or more images, wherein the location information identifies a location of the mobile computing device during capture of individual images.

7. The method of embodiment 1 further comprising obtaining location information identifying a location of the mobile computing device during input indicating completion of the first inspection.

8. The method of embodiment 1, wherein providing at least a portion of data associated with the completion of the inspection location to a vehicle management system is provided after the vehicle inspection report has been completed.

9. The method of embodiment 1 further comprising providing instructions associated with the inspection of the first inspection location.

10. The method of embodiment 1 further comprising providing an indication within the user interface of a second inspection location on the vehicle for inspection.

11. A system for remote verification of a vehicle inspection, the method comprising:
- a data store configured to store vehicle inspection information associated with a plurality of vehicle inspection reports;
- a computing device comprising a hardware processor configured with executable instruction that configure the processor to:
  - receive a first image of at least a portion of a vehicle comprising vehicle identification information;
  - obtain vehicle identification information identifying a vehicle based, at least in part, on an analysis of the first image;
  - provide an interface associated with a vehicle inspection report for the identified vehicle, the vehicle inspection report comprising at least one data field associated with an inspection location on the vehicle;
  - capture one or more images associated with the inspection location on the vehicle included within the vehicle inspection report;
  - update the vehicle inspection report to indicate that the completion of the inspection location on the vehicle.

12. The system of embodiment 11, wherein the analysis of the first image is performed by the mobile computing device.

13. The system of embodiment 11, wherein the computing device is further configured to transmit the first image to the vehicle management server, wherein the analysis of the first image is performed by the vehicle management system.

14. The system of embodiment 11, wherein the vehicle identification information is obtained from a license plate.

15. The system of embodiment 11, wherein the computing device is further configured to obtain a vehicle inspection report associated with the identified vehicle from the data store.

16. The system of embodiment 11 further comprising obtaining location information associated with the one or more images, wherein the location information identifies a location of the mobile computing device during capture of individual images.

17. The system of embodiment 11, wherein the computing device is further configured to transmit at least a portion of information included within the vehicle inspection report to a vehicle management system after completion of the vehicle inspection report.

18. A method of remote verification of a vehicle inspection, the method comprising:
- receiving a first image of at least a portion of a vehicle comprising vehicle identification information;
- processing the first image to identify a vehicle based, at least in part, on the vehicle identification information;
- providing an interface associated with a vehicle inspection report for the identified vehicle, the vehicle inspection report comprising at least one data field associated with an inspection location on the vehicle;
- receiving one or more images associated with the inspection location on the vehicle included within the vehicle inspection report; and
- receiving an input indicating completion of the inspection location on the vehicle.

19. The method of embodiment 18 further comprising identifying an orientation of the vehicle based, at least in part, on location information received from the vehicle.

20. The method of embodiment 18 further comprising identifying the location of the vehicle based, at least in part, on location information received from the vehicle.

21. The method of embodiment 18 further comprising identifying the location of the mobile computing device relative to the location of the vehicle based, at least in part, on location information received from the mobile computing device and location information received from the vehicle.

22. The method of embodiment 21, wherein the inspection point is associated with at least one reporting parameter defining a proximity requirement of the inspection point.

23. The method of embodiment 22 further comprising determining whether the at least one reporting parameter associated with the inspection point is satisfied based, at least in part, on the location of the mobile computing device relative to the location of the vehicle.

24. A computer-implemented method of remote proximity detection during a vehicle inspection, the method comprising:
- determining a vehicle location and a vehicle orientation, based at least in part, on vehicle location information received from at least one location device of a vehicle;
- determining a location of an inspection point of the vehicle, based at least in part, on the determined vehicle location and the vehicle orientation;
- determining a location of an operator device based, at least in part, on operator device location information received from the operator device;
- determining a distance between the location of the operator device and the location of the inspection point; and
- determining whether the determined distance between the location of the operator device and the location of the inspection point satisfies a proximity threshold associated with the inspection point; and
- based on a determination that the determined distance satisfies the proximity threshold, outputting an indication of compliance to the operator device.

25. The method of embodiment 24, wherein the proximity threshold identifies a maximum distance between the operator device and the inspection point.

26. The method of embodiment 24 further comprising:

27. based on a determination that the determined distance does not satisfy the proximity threshold, outputting an indication of noncompliance to the operator device.

28. The method of embodiment 26, wherein the indication of noncompliance includes the determined distance and a distance associated with the proximity threshold.

29. The method of embodiment 26 further comprising updating the location of the operator device and updating the determined distance between the location of the operator device and the location of the inspection point during the inspection of the vehicle.

30. The method of embodiment 24, wherein determining the distance between the location of the operator device and the location of the inspection point is performed during inspection of the vehicle by the operator.

31. A method of documenting a vehicle inspection report, the method comprising:
by a mobile computing device comprising computer hardware and at least one motion detection sensor:
receiving a first input indicating initiation of a vehicle inspection of a vehicle;
receiving an identification of the vehicle;
detecting movement of the mobile computing device by the at least one motion detection sensor;
outputting, by the at least one motion detection sensor, an indication of movement based, at least in part, on the detected movement;
storing data corresponding to the to the detected movement of the mobile computing device;
receiving a second input indicating completion of a vehicle inspection; and
storing the vehicle inspection report, the vehicle inspection report comprising data corresponding to the detected movement of the mobile computing device.

32. The method of embodiment 31 further comprising:
determining whether the movement of the mobile computing device during the vehicle inspection satisfied a movement threshold associated with completion on the vehicle inspection report based, at least in part, on a first portion of sensor data;
based on the determination that the movement threshold was satisfied, storing the vehicle inspection report in a data store on the mobile computing device.

33. The method of embodiment 32, wherein the first portion of sensor data is within a defined frequency range.

34. The method of embodiment 33, wherein the defined frequency range is between 1 Hz and 3 Hz.

35. The method of embodiment 33, wherein the defined frequency range is associated with a user walking with the mobile computing device.

36. The method of embodiment 32, wherein the movement threshold identifies translational movement associated with the movement of the mobile computing device during the inspection.

37. The method of embodiment 33 further comprising filtering motion sensor data outside a defined a frequency range.

38. The method of embodiment 31 further comprising:
receiving an input indicating inspection of a vehicle component;
identifying at least a portion of the sensor data indicating movement of the mobile computing device associated with inspection of the vehicle component;
determining whether movement of the mobile computing device satisfied an inspection movement threshold associated with inspection of the vehicle component based, at least in part, the portion of sensor data.

39. The method of embodiment 38, wherein the inspection movement threshold defines at least one of acceleration information or orientation information associated with the inspection of the component.

40. The method of embodiment 38, wherein the first portion of sensor data is associated with a first sensor of the at least one sensor and the second portion of sensor data is associated with a second sensor of the at least one sensor.

41. A system for validating a vehicle inspection, the system comprising:
a data store configured to store vehicle inspection information associated with a plurality of vehicle inspection reports;
a computing device comprising at least one motion detection sensor and a hardware processor configured with executable instruction that configure the processor to:
receive a first input indicating initiation of a vehicle inspection of a vehicle;
receive an identification of the vehicle;
detect movement of the mobile computing device by the at least one motion detection sensor;
output, by the at least one motion detection sensor, an indication of movement based, at least in part, on the detected movement;
store data corresponding to the to the detected movement of the mobile computing device;
determine whether the detected movement of the mobile computing device during the vehicle inspection satisfied a movement threshold associated with completion on the vehicle inspection report based, at least in part, on a first portion of sensor data;
based on the determination that the movement threshold was satisfied, storing the vehicle inspection report in a data store on the mobile computing device.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of remote verification of a vehicle inspection comprising a plurality of inspections of a plurality of vehicle inspection locations, respectively, the method comprising:
by a mobile computing device comprising computer hardware:
capturing a first identification image of at least a portion of a vehicle, the portion of the vehicle comprising a vehicle identification indicia, and wherein the captured first identification image comprises an image of the vehicle identification indicia;
obtaining vehicle identification information identifying a vehicle based, at least in part, on an analysis of the first identification image;
providing an interface associated with a vehicle inspection report for the identified vehicle, the vehicle inspection report comprising at least one data field associated with a first inspection of a first inspection location on the vehicle;
capturing at least a first inspection image of the first inspection location on the vehicle;
adding the first inspection image to the vehicle inspection report and in association with first inspection data of the first inspection;
receiving an input indicating completion of the first inspection of the first inspection location on the vehicle; and
providing at least a portion of the first inspection data associated with the completion of the first inspection to a vehicle management system that:
obtains location information of the mobile computing device identifying locations of the mobile computing device during the vehicle inspection;
reconstructs a virtual footprint of the vehicle based on the location information of the mobile computing device; and compares the virtual footprint with location information associated with the vehicle to determine the location of the mobile computing device relative to the vehicle during the vehicle inspection.

2. The method of claim 1, wherein the analysis of the first identification image is performed by the mobile computing device.

3. The method of claim 1 further comprising transmitting the first identification image to the vehicle management system, wherein the analysis of the first identification image is performed by the vehicle management system.

4. The method of claim 1, wherein the vehicle identification indicia comprises a license plate.

5. The method of claim 1 further comprising automatically populating the vehicle inspection report based on stored information associated with the identified vehicle.

6. The method of claim 1 further comprising obtaining the location information associated with the first inspection image, wherein the location information identifies a location of the mobile computing device during capture of the first inspection image.

7. The method of claim 1 further comprising obtaining the location information in response to receiving input indicating completion of the first inspection.

8. The method of claim 1, wherein providing at least a portion of data associated with the completion of the inspection location to the vehicle management system is provided after the vehicle inspection report has been completed.

9. The method of claim 1 further comprising providing instructions associated with the inspection of the first inspection location.

10. The method of claim 1 further comprising providing an indication within the user interface of a second inspection location on the vehicle for inspection.

11. A system for remote verification of a vehicle inspection, the system comprising:
a data store configured to store vehicle inspection information associated with a plurality of vehicle inspection reports;
a computing device comprising a hardware processor configured with executable instructions that configure the processor to:
receive a first image of at least a portion of a vehicle comprising vehicle identification information;
obtain vehicle identification information identifying a vehicle based, at least in part, on an analysis of the first image;
provide an interface associated with a vehicle inspection report for the identified vehicle, the vehicle inspection report comprising at least one data field associated with an inspection location on the vehicle;
capture one or more images associated with the inspection location on the vehicle included within the vehicle inspection report; and
update the vehicle inspection report to indicate that the completion of the inspection location on the vehicle; and
a vehicle management system configured to:
obtain location information of the mobile computing device identifying locations of the mobile computing device during the vehicle inspection;
reconstruct a virtual footprint of the vehicle based on the location information of the mobile computing device; and
compare the virtual footprint with location information associated with the vehicle to determine the location of the mobile computing device relative to the vehicle during the vehicle inspection.

12. The system of claim 11, wherein the analysis of the first image is performed by the computing device.

13. The system of claim 11, wherein the computing device is further configured to transmit the first image to the vehicle management system, wherein the analysis of the first image is performed by the vehicle management system.

14. The system of claim 11, wherein the vehicle identification information is obtained from a license plate.

15. The system of claim 11, wherein the computing device is further configured to obtain the vehicle inspection report associated with the identified vehicle from the data store.

16. The system of claim 11 further comprising obtaining the location information associated with the one or more images, wherein the location information identifies a location of the computing device during capture of each image of the one or more images.

17. The system of claim 11, wherein the computing device is further configured to transmit at least a portion of information included within the vehicle inspection report to the vehicle management system after completion of the vehicle inspection report.

* * * * *